(12) United States Patent
Seguchi

(10) Patent No.: US 11,124,007 B2
(45) Date of Patent: Sep. 21, 2021

(54) INK JET RECORDING METHOD, INK JET RECORDING APPARATUS, AND SET OF RECORDING HEAD AND TREATMENT LIQUID

(71) Applicant: Seiko Epson Corporation, Tokyo (JP)

(72) Inventor: Kenichi Seguchi, Okaya (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/728,166

(22) Filed: Dec. 27, 2019

(65) Prior Publication Data

US 2020/0207141 A1 Jul. 2, 2020

(30) Foreign Application Priority Data

Dec. 28, 2018 (JP) .............................. JP2018-248010

(51) Int. Cl.
*B41M 7/00* (2006.01)
*C09D 11/36* (2014.01)
*B41J 2/18* (2006.01)
*B41J 2/155* (2006.01)
*B41J 2/15* (2006.01)
*B41J 2/165* (2006.01)

(52) U.S. Cl.
CPC .............. *B41M 7/0018* (2013.01); *B41J 2/15* (2013.01); *B41J 2/155* (2013.01); *B41J 2/16526* (2013.01); *B41J 2/18* (2013.01); *C09D 11/36* (2013.01)

(58) Field of Classification Search
CPC .... B41M 7/0018; C09D 11/36; C09D 11/102; C09D 11/107; C09D 11/322; C09D 11/40; C09D 11/54; C09D 11/38; B41J 2/18; B41J 2/155; B41J 2/15; B41J 2/16526; B41J 2002/14411; B41J 11/002; B41J 11/0015; B41J 2/2114; B41J 2/04551; B41J 2/04581; B41J 2002/14241; B41J 2002/14419; B41J 2002/14491; B41J 2202/11; B41J 2/14233; B41J 2202/12; B41J 29/38
USPC ......................................................... 347/95
See application file for complete search history.

(56) References Cited

U.S. PATENT DOCUMENTS

| | | | |
|---|---|---|---|
| 2009/0237442 A1* | 9/2009 | Yamanobe | C09D 11/40 347/21 |
| 2017/0247561 A1* | 8/2017 | Nakagawa | B41J 11/0015 |
| 2018/0126731 A1* | 5/2018 | Ishikawa | B41J 2/1433 |

FOREIGN PATENT DOCUMENTS

JP 2017-043701 A 3/2017

* cited by examiner

*Primary Examiner* — Huan H Tran
*Assistant Examiner* — Alexander D Shenderov
(74) *Attorney, Agent, or Firm* — Harness, Dickey & Pierce, P.L.C.

(57) ABSTRACT

An ink jet recording method includes an ink attachment step, in which an aqueous ink composition is ejected from a recording head and attached to a recording medium, and a treatment liquid attachment step, in which a treatment liquid containing a flocculant is ejected from a recording head and attached to the recording medium. The recording head for ejecting the treatment liquid has a circulation channel in which the treatment liquid is circulated.

18 Claims, 8 Drawing Sheets

INK JET RECORDING METHOD, INK JET RECORDING APPARATUS, AND SET OF RECORDING HEAD AND TREATMENT LIQUID

The present application is based on, and claims priority from, JP Application Serial Number 2018-248010, filed Dec. 28, 2018, the disclosure of which is hereby incorporated by reference herein in its entirety.

BACKGROUND

1. Technical Field

The present disclosure relates to an ink jet recording method, an ink jet recording apparatus, and a set of a recording head and a treatment liquid.

2. Related Art

Ink jet recording method is a method in which droplets of ink are ejected from very thin nozzles and attached to a recording medium to produce a recording. A feature of this method is that a high-resolution and high-quality image can be recorded quickly and with a relatively affordable system.

For example, studies are ongoing on printing with an aqueous ink by ink jetting, for example on a film. An example of an aqueous ink is an ink that is water-based and contains, for example, a colorant and a resin. For example, JP-A-2017-043701 discloses an ink set, a recording method, etc., in which a reactant containing a flocculant is used to flocculate substances in an ink and thereby to form an image.

Using a reactant as in the technology described in JP-A-2017-043701 hopefully helps obtain an image with reduced bleed because the reactant helps flocculate components of the ink quickly. Since the ink contains substances that aggregate, such as a colorant and resin particles, a concern is that poor ejection can occur, for example when a mist of the reactant (treatment liquid) flies to the nozzles for the ink. Unlike ink, which contains substances that aggregate (components that are flocculated), treatment liquid, which flocculates components of the ink, should be unlikely to cause that type of poor ejection. Studies, however, have started to reveal that even with treatment liquid, the stability of ejection from the recording head is not always high.

SUMMARY (1) A form of an ink jet recording method according to an aspect of the present disclosure includes an ink attachment step including ejecting an aqueous ink composition from a recording head to attach the aqueous ink composition to a recording medium, and a treatment liquid attachment step including ejecting a treatment liquid containing a flocculant from a recording head to attach the treatment liquid to the recording medium. The recording head for ejecting the treatment liquid has a circulation channel configured to circulate the treatment liquid.

(2) In form (1) above, the treatment liquid may contain a resin.

(3) In form (1) or (2) above, the treatment liquid may contain a resin, and the resin may be a cationic polymer as the flocculant or may be resin particles.

(4) In any of forms (1) to (3) above, the treatment liquid may contain the flocculant and at least one type of resin particles.

(5) In form (4) above, the resin particles may be one or two or more of anionic resins and nonionic resins.

(6) In form (4) above, the resin may be resin particles and one or two or more of urethane resins and acrylic resins.

(7) In form (4) above, the resin may be resin particles, and the glass transition temperature of the resin particles may be 40.0° C. or more.

(8) In any of forms (1) to (7) above, the treatment liquid may contain a nitrogen-containing solvent.

(9) In form (8) above, the percentage of the nitrogen-containing solvent to all organic solvents in the treatment liquid may be 50.0% by mass or more.

(10) In form (8) or (9) above, the treatment liquid may contain an acyclic amide as the nitrogen-containing solvent.

(11) In any of forms (1) to (10) above, the recording method may include a drying step including drying, using at least one drying mechanism, the treatment liquid attached to the recording medium in the treatment liquid attachment step.

(12) In (11) above, the drying mechanism may be one or two or more of conduction, aeration, and radiation drying mechanisms.

(13) In any of forms (1) to (12) above, the surface temperature of the recording medium in the treatment liquid attachment step may be 30.0° C. or more.

(14) In any of forms (1) to (13) above, the recording medium may be a low-absorbent recording medium or non-absorbent recording medium.

(15) In any of forms (1) to (14) above, the flow rate of the treatment liquid in the circulation channel may be 0.1 times or more and 5.0 times or less the maximum rate of ejection of the treatment liquid from the recording head onto the recording medium.

(16) In any of forms (1) to (15) above, the recording head used in the treatment liquid attachment step may have a pressure chamber configured to apply pressure to the treatment liquid to eject the treatment liquid from a nozzle. After the treatment liquid passes through the pressure chamber, the circulation channel may supply the treatment liquid back to the pressure chamber.

(17) In any of forms (1) to (16) above, in the treatment liquid attachment step, the circulation channel may drain the treatment liquid out of the recording head and then supply the treatment liquid back to the recording head.

(18) In any of forms (1) to (17) above, the recording heads may be line heads.

(19) In any of forms (1) to (18) above, the recording heads may be serial heads.

(20) In form (19) above, the treatment liquid attachment step and the ink attachment step may be performed through multiple main scans and multiple sub-scans. A main scan is a movement of the recording heads in a main scanning direction, and a sub-scan is a movement of the recording medium in a sub-scanning direction as a direction crossing the main scanning direction. The recording heads may have a first ejecting nozzle group as a line of nozzles arranged in the sub-scanning direction and configured to eject the treatment liquid, and a second ejecting nozzle group as a line of nozzles arranged in the sub-scanning direction and configured to eject the aqueous ink composition. The first ejecting nozzle group may overlap, at least in a portion, the second ejecting nozzle group when projected in the main scanning direction.

(21) A form of an ink jet recording apparatus according to an aspect of the present disclosure includes a recording head configured to eject an aqueous ink composition to attach the aqueous ink composition to a recording medium, and a recording head configured to eject a treatment liquid containing a flocculant to attach the treatment liquid to the recording medium. The recording head configured to eject the treatment liquid has a circulation channel configured to circulate the treatment liquid.

(22) A form of a set according to an aspect of the present disclosure of a recording head and a treatment liquid includes a treatment liquid containing a flocculant and a recording head configured to eject the treatment liquid. The recording head configured to eject the treatment liquid has a circulation channel configured to circulate the treatment liquid. The set is for use in an ink jet recording method including ejecting an aqueous ink composition from a recording head to attach the aqueous ink composition to a recording medium, and ejecting the treatment liquid from the recording head to attach the treatment liquid to the recording medium.

DESCRIPTION OF EXEMPLARY EMBODIMENTS

Figure 1:
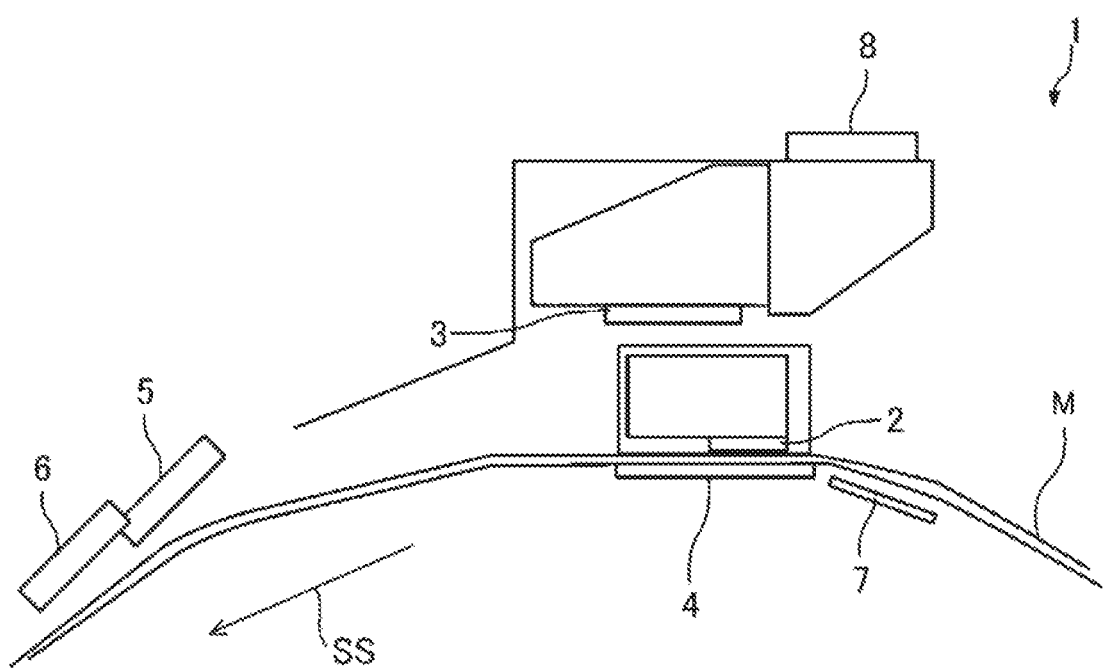
FIG. 1 is an outline illustration of an example of an ink jet recording apparatus for use in an ink jet recording method according to an embodiment.

The following describes embodiments of the present disclosure. The following embodiments are descriptions of examples of the disclosure. The disclosure is never limited to these embodiments and includes variations implemented within the gist of the disclosure. Not all the configurations described below are essential for the disclosure.

1. Ink Jet Recording Method

An ink jet recording method according to this embodiment includes an ink attachment step, in which an aqueous ink composition is ejected from a recording head and attached to a recording medium, and a treatment liquid attachment step, in which a treatment liquid containing a flocculant is ejected from a recording head, the recording head having a circulation channel in which the treatment liquid is circulated, and attached to the recording medium. The following describes the recording medium first, and then each step.

1.1. Recording Medium

The recording medium on which an image is formed in the ink jet recording method according to this embodiment may have a recording surface that absorbs liquids, such as aqueous ink compositions and treatment liquids, or may have no recording surface that absorbs liquids. The recording medium can therefore be of any type, including liquid-absorbing recording media, such as paper, films, and cloths, low-liquid-absorbing recording media, such as paper for actual printing, and non-liquid-absorbing recording media, such as metals, glass, and polymers. The great advantages of the ink jet recording method according to this embodiment, however, become more significant when an image is recorded on a low- or non-liquid-absorbing recording medium.

A low- or non-liquid-absorbing recording medium is a recording medium that has the quality of absorbing little or no liquid. In quantitative terms, a non- or low-liquid-absorbing recording medium is a "recording medium that absorbs 10 mL/m$^2$ or less water from the start of contact until 30 msec$^{1/2}$ in the Bristow test." The Bristow test is the most widespread method for brief measurement of liquid absorption and has also been adopted by Japan Technical Association of the Pulp and Paper Industry (JAPAN TAPPI). The details of the test method are set forth in No. 51 of "JAPAN TAPPI Test Method 2000," which specifies the Bristow test as a method for testing the absorption of liquid in paper and paperboards. A liquid-absorbing recording medium, on the other hand, is a recording medium that is not non- or low-liquid-absorbing. Being low- and non-liquid-absorbing may be simply referred herein to as low-absorbent and non-absorbent, respectively.

Examples of non-liquid-absorbing recording media include a plastic film or plate, such as of polyvinyl chloride, polyethylene, polypropylene, or polyethylene terephthalate (PET), a metal plate, such as of iron, silver, copper, or aluminum, a metal plate produced by the deposition of any such metal, a plastic film, and an alloy plate, such as of stainless steel or brass. Recording media such as paper or any other base material coated with plastic, paper or any other base material with a plastic film bonded thereto, and a plastic film having no absorbing layer (receiving layer) are also examples. The plastic can be, for example, polyvinyl chloride, polyethylene terephthalate, polycarbonate, polystyrene, polyurethane, polyethylene, or polypropylene.

An example of a low-liquid-absorbing recording medium is a recording medium that has a coating layer for receiving liquids (receiving layer) on its surface. An example of one that includes paper as the base material is paper for actual printing, and examples of ones that include a plastic film as the base material include films of polyvinyl chloride, polyethylene terephthalate, polycarbonate, polystyrene, polyurethane, polyethylene, polypropylene, etc., having a coated surface, for example coated with a hydrophilic polymer, or having a surface coated with particles, for example of silica or titanium, and a binder.

A liquid-absorbing recording medium can be of any type, but examples range from printing paper with high permeability to liquids, such as electrophotographic paper, and ink jet paper (dedicated paper for ink jetting, which has an ink-absorbing layer formed by silica or alumina particles or an ink-absorbing layer formed by a hydrophilic polymer, such as polyvinyl alcohol (PVA) or polyvinyl pyrrolidone (PVP)) to paper that has relatively low permeability to liquids and is used in general offset printing, such as art paper, coated paper, and cast-coated paper. Fabrics and nonwovens are also examples of liquid-absorbing recording media.

The recording medium may be, for example, colorless and transparent, translucent, colored and transparent, chromatically colored and opaque, or achromatically colored and opaque. The recording medium may be colored and/or translucent or transparent in itself.

1.2. Treatment Liquid Attachment Step

The ink jet recording method according to this embodiment includes a treatment liquid attachment step. In the treatment liquid attachment step, a treatment liquid containing a flocculant is attached to the recording medium.

1.2.1. Treatment Liquid

The treatment liquid used in the ink jet recording method according to this embodiment contains a flocculant. The flocculant flocculates a subset or all of the substances, such as a colorant and resin particles, contained in the aqueous ink composition used in the ink attachment step.

1.2.1.1. Flocculant

The flocculant reacts with substances, such as a colorant and resin particles, contained in the aqueous ink composition, thereby causing the colorant and/or the resin particles to aggregate. The flocculation helps in, for example, improving the color strength of the colorant, improving the fixation of the image, and/or increasing the viscosity of the aqueous ink composition.

The flocculant can be of any kind, but examples include metal salts, acids, and miscellaneous cationic compounds. An acid can be an inorganic or organic acid. Miscellaneous cationic compounds that can be used include cationic resins (sometimes called cationic polymers), cationic surfactants, etc. For metal salts, polyvalent metal salts are preferred. For miscellaneous cationic compounds, cationic resins are preferred. For acids, organic acids are preferred. It is therefore preferred that the flocculant be any one of a cationic resin, an organic acid, and a polyvalent metal salt because this makes the image superb, for example in quality, abrasion resistance, and gloss. A combination of multiple flocculants can also be used.

A metal salt is preferably a polyvalent metal salt, but metal salts that are not polyvalent can also be used. Of these flocculants, it is particularly preferred to use at least one selected from metal salts and organic acids. They are superior in reactivity with substances contained in the ink.

A polyvalent metal salt is a compound formed by a metal ion with a valency of two or more and an anion. Examples of metal ions with a valency of two or more include the ions of calcium, magnesium, copper, nickel, zinc, barium, aluminum, titanium, strontium, chromium, cobalt, and iron. Of these metal ions that form a polyvalent metal salt, it is particularly preferred to use at least one of the calcium ion and the magnesium ion. These metal ions are superior in flocculating components of the ink.

The anion in a polyvalent metal salt is an inorganic or organic ion. That is, a polyvalent metal salt in this embodiment is formed by an inorganic or organic ion and a polyvalent metal. The inorganic ion can be the chloride, bromide, iodide, nitrate, sulfate, or hydroxide ion. The organic ion can be an organic acid ion, such as the carboxylate ion.

Preferably, the polyvalent metal compound is an ionic polyvalent metal salt. In particular, a magnesium or calcium salt gives the treatment liquid better stability. The counterion for the polyvalent metal may be an inorganic acid or organic acid ion.

Specific examples of polyvalent metal salts include calcium carbonates, such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, and aluminum acetate. One of these polyvalent metal salts may be used alone, or two or more may be used in combination. Of these, it is particularly preferred to use at least one of magnesium sulfate, calcium nitrate, and calcium chloride, more preferably magnesium sulfate and/or calcium nitrate. These salts help ensure sufficient solubility in water, and they also reduce marking caused by the treatment liquid (make marks less noticeable). The metal salts listed may have water of hydration in their raw-material form.

Examples of metal salts that are not polyvalent include monovalent metal salts, such as sodium salts and potassium salts. To name a few, sodium sulfate and potassium sulfate are examples of such metal salts.

Examples of preferred organic acids include poly(meth) acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, derivatives of these compounds, and salts thereof. One organic acid may be used alone, or two or more may be used in combination. Of salts of acids (organic or inorganic), those that are metal salts are categorized as the aforementioned metal salts.

Examples of preferred inorganic acids include sulfuric acid, hydrochloric acid, nitric acid, and phosphoric acid. One inorganic acid may be used alone, or two or more may be used in combination.

Examples of cationic resins (cationic polymers) include cationic urethane resins, cationic olefin resins, cationic amine resins, and cationic surfactants. Water-soluble cationic polymers are preferred.

A cationic urethane resin can be a commercially available one. Examples include HYDRAN CP-7010, CP-7020, CP-7030, CP-7040, CP-7050, CP-7060, and CP-7610 (trade names, Dainippon Ink and Chemicals, Inc.), SUPERFLEX (SF) 600, 610, 620, 630, 640, and 650 (trade names, DKS Co. Ltd.), and WBR-2120C and WBR-2122C urethane emulsions (trade names, Taisei Fine Chemical Co., Ltd.).

A cationic olefin resin is a resin that has an olefin, such as ethylene or propylene, as its structural backbone and can be a suitable one selected from known cationic olefin resins. The cationic olefin resin may be in emulsion form, in which the resin has been dispersed in a solvent, such as water or an organic solvent. The cationic olefin resin can be a commercially available one. Examples include ARROWBASE CB-1200 and CD-1200 (trade names, Unitika Ltd.).

A cationic amine resin only needs to have an amino group in its structure and can be a suitable one selected from known cationic amine resins. Examples include polyamine resins, polyamide resins, and polyallylamine resins. A polyamine resin is a resin that has an amino group in its resin backbone. A polyamide resin is a resin that has an amide group in its resin backbone. A polyallylamine resin is a resin that has an allyl-derived structure in its resin backbone.

Examples of cationic polyamine resins include Senka Corporation UNISENCE KHE103L (hexamethylenediamine/epichlorohydrin resin; pH of a 1% aqueous solution, approximately 5.0; viscosity, 20 to 50 (mPa·s); a 50% by mass solids aqueous solution) and UNISENCE KHE104L (dimethylamine/epichlorohydrin resin; pH of a 1% aqueous solution, approximately 7.0; viscosity, 1 to 10 (mPa·s); a 20% by mass solids aqueous solution). Further specific examples of commercially available cationic polyamine resins include FL-14 (SNF), ARAFIX 100, 251S, 255, and 255LOX (Arakawa Chemical), DK-6810, 6853, and 6885 and WS-4010, 4011, 4020, 4024, 4027, and 4030 (Seiko PMC), PAPYOGEN P-105 (Senka), Sumirez Resin 650(30), 675A, 6615, and SLX-1 (Taoka Chemical), Catiomaster® PD-1, 7, 30, A, PDT-2, PE-10, PE-30, DT-EH, EPA-SK01, and TMHMDA-E (Yokkaichi Chemical), and JETFIX 36N, 38A, and 5052 (Satoda Chemical Industrial).

Examples of polyallylamine resins include polyallylamine hydrochloride, polyallylamine amidosulfate, allylamine hydrochloride-diallylamine hydrochloride copolymers, allylamine acetate-diallylamine acetate copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymers, diallylmethylethylammonium ethyl sulfite-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers.

Examples of cationic surfactants include primary, secondary, and tertiary amine salt compounds, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts. Specific examples include hydrochlorides, acetates, and similar salts of laurylamine, coconut amine, and rosin amine and lauryltrimethylammonium chloride, cetyltrimethylammonium chloride, benzyltributylammonium chloride, benzalkonium chlorides, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammonium chloride.

A cationic resin can be a water-soluble resin or resin particles. Of these, a water-soluble resin is preferred in that it provides excellent image quality by making the treatment liquid highly reactive with the ink and also provides better ejection stability of the treatment liquid. Resin particles, on the other hand, are preferred in that they provide better abrasion resistance of the resulting image.

An example of a water-soluble resin is a cationic resin that is as described above and is water-soluble. Being water-soluble means that when the resin is mixed in water to 1% by mass and stirred well at the ordinary temperature, no resin particles are left, and the liquid mixture is not turbid as a whole.

Cationic resin particles can be resin particles that are as described below except for being cationic. Examples include acrylic resins, urethane resins, and olefin resins.

The resin particles, similar to resin particles as described below though, can be particles of a cationic resin. An example of a cationic resin is a resin that has a cationic functional group. An example of a cationic functional group is the amino group.

Of these flocculants, the use of one or two or more selected from polyvalent metal salts, cationic polymers, and organic acids helps form an image of higher quality by virtue of their better flocculating effect. The use of cationic polymer(s) makes the circulation of the treatment liquid in the circulation channel more advantageous. With cationic polymer(s), the aqueous ink composition more easily becomes viscous upon drying than with the other substances.

The total flocculant content of the treatment liquid is not critical, but preferably is 0.1% by mass or more and 20.0% by mass or less of the total mass of the treatment liquid. The total flocculant content is preferably 0.5% by mass or more and 15.0% by mass or less, more preferably 1.0% by mass or more and 10.0% by mass or less, even more preferably 2.0% by mass or more and 10.0% by mass or less.

1.2.1.2. Extra Ingredients

Besides the flocculant, the treatment liquid may contain ingredients such as water, an organic solvent, a surfactant, resin particles, wax, an excipient, a preservative/antimold, an antirust, a chelating agent, a viscosity modifier, an antioxidant, and a fungicide unless its functions are impaired. The extra ingredients described in this section can also be used in the aqueous ink composition (described below). The description in this section therefore includes different preferences for selection, percentage, etc.

1.2.1.2.(1) Water

The treatment liquid and aqueous ink composition used in the ink jet recording method according to this embodiment may contain water. The treatment liquid and the aqueous ink composition are preferably water-based. A water-based composition contains water as a major solvent component. The water may be contained as the primary solvent component and is a component that evaporates away upon drying. Preferably, the water is of a type from which ionic impurities have been removed to the lowest possible levels, such as ion exchange water, ultrafiltered water, reverse osmosis water, distilled water, or any other type of purified water or ultrapure water. The use of sterilized water, for example sterilized by ultraviolet irradiation or adding hydrogen peroxide, is preferred because it helps control the development of molds and bacteria when the treatment liquid and/or the aqueous ink composition is/are stored long. The water content is preferably 45% by mass or more, more preferably 50% by mass or more and 98% by mass or less, even more preferably 55% by mass or more and 95% by mass or less of the total mass of the treatment liquid or aqueous ink composition.

1.2.1.2.(2) Organic Solvent

The treatment liquid and/or aqueous ink composition used in the ink jet recording method according to this embodiment may contain an organic solvent. Preferably, the organic solvent is water-soluble. Examples of functions of the organic solvent include to improve the wettability of the treatment liquid or aqueous ink composition on the recording medium and to enhance the water retention of the treatment liquid or aqueous ink composition. Examples of organic solvents include esters, alkylene glycol ethers, cyclic esters, nitrogen-containing solvents, and polyhydric alcohols. Examples of nitrogen-containing solvents include cyclic amides and acyclic amides. Examples of acyclic amides include alkoxyalkylamides.

An organic solvent contained in the treatment liquid and/or aqueous ink composition preferably has a normal boiling point of 280.0° C. or less, preferably 160.0° C. or more and 270.0° C. or less, more preferably 180.0° C. or more and 260.0° C. or less, even more preferably 200.0° C. or more and 250.0° C. or less. Such an organic solvent is preferred in that it helps reduce white haze and that it provides better characteristics, such as abrasion resistance and ejection stability.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

An alkylene glycol ether can be any monoether or diether of an alkylene glycol, preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Of these alkylene glycol ethers, diethers are preferred to monoethers. The abrasion resistance of the resulting image tends to be better with diethers because diethers tend to be more effective in dissolving any resin particles in the treatment liquid or aqueous ink composition or making the resin particles swell.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds resulting from the substitution of hydrogen(s) of the methylene group next to the carbonyl group of these lactones with a C1 to C4 alkyl group.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are preferred in that they promote the dissolution of the flocculant and help resin particles as described below form a coating. 2-Pyrrolidone is particularly preferred.

It is also preferred to use an alkoxyalkylamide, a type of acyclic amide. An alkoxyalkylamide is a compound represented by general formula (1).

$$R^1\text{—O—}CH_2CH_2\text{—}(C\!=\!O)\text{—}NR^2R^3 \quad (1)$$

In formula (1), $R^1$ denotes a C1 to C4 alkyl group, and $R^2$ and $R^3$ each independently denote a methyl or ethyl group. The "C1 to C4 alkyl group" can be linear or branched. To name a few, it can be a methyl, ethyl, n-propyl, isopropyl, n-butyl, sec-butyl, isobutyl, or tert-butyl group. One of those compounds represented by formula (1) may be used alone, or two or more may be used as a mixture.

An example of a function of the compound represented by formula (1) is to enhance the surface-drying characteristics and fixation of the treatment liquid and/or aqueous ink composition when attached to a low-absorbent recording medium. In particular, those compounds represented by formula (1) are highly effective in softening/dissolving vinyl chloride resins moderately. The compound represented by formula (1) therefore softens/dissolves the recording surface of a recording medium containing a vinyl chloride resin, thereby helping the treatment liquid or aqueous ink composition penetrate into the recording medium. The penetration of the treatment liquid or aqueous ink composition into the recording medium provides firm fixation of the ink and makes the surface of the ink easier to dry. The resulting image is therefore likely to be superior in surface-drying characteristics and fixation.

More preferably, $R^1$ in formula (1) is a methyl group, a C1 alkyl group. Those compounds of formula (1) having a methyl group in $R^1$ have low normal boiling points compared with those having a C2 to C4 alkyl group in $R^1$. The use of a compound of formula (1) having a methyl group in $R^1$ can therefore further improve the surface drying characteristics of the area of the recording medium to which the treatment liquid or aqueous ink composition is attached.

When a compound represented by formula (1), an acyclic amide, is used, its percentage is not critical but can be any of the preferred percentages, to the total mass of the treatment liquid and/or aqueous ink composition, specified below for nitrogen-containing solvents. Alternatively, the percentage is preferably 2% by mass or more and 50% by mass or less, more preferably 5% by mass or more and 40% by mass or less, even more preferably 8% by mass or more and 20% by mass or less. Such an amount of a compound represented by formula (1), an acyclic amide, can further improve the fixation and surface-drying characteristics of the image. It is also preferred that the percentage of those compounds represented by formula (1) above, among other acyclic amides, be in any of the above ranges.

Especially for the treatment liquid, the presence of an alkoxyamide, as a nitrogen-containing solvent, in the treatment liquid is particularly preferred because it tends to limit drying near nozzles. Alkoxyamides, moreover, are highly effective in softening/dissolving the surface of a low-absorbent recording medium, such as a vinyl chloride resin, moderately.

In the treatment liquid and/or aqueous ink composition, the total percentage of nitrogen-containing solvents is 1% by mass or more or 40% by mass or less, more preferably 2% by mass or more and 30% by mass or less, even more preferably 3% by mass or more and 25% by mass or less, still more preferably 5% by mass or more and 23% by mass or less, further preferably 7% by mass or more and 20% by mass or less, in particular 11% by mass or more and 20% by mass or less. This makes the resulting image better in, for example, abrasion resistance.

Furthermore, it is preferred that the percentage of nitrogen-containing solvents to all organic solvents in the treatment liquid be 40.0% by mass or more, more preferably 50.0% by mass or more or 60.0% by mass or more. This makes the resulting image even better in, for example, abrasion resistance. As for the upper limit, the percentage is 100% by mass or less, preferably 80% by mass or less, more preferably 70% by mass or less, even more preferably 60% by mass or less.

Examples of polyhydric alcohols includes 1,2-alkanediols (e.g., alkanediols such as ethylene glycol, propylene glycol (also known as propane-1,2-diol), 1,2-butanediol, 1,2-pentanediol, 1,2-hexanediol, 1,2-heptanediol, and 1,2-octanediol) and polyhydric alcohols other than 1,2-alkanediols (polyols) (e.g., diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol).

Polyhydric alcohols can be divided into alkanediols and polyols. An alkanediol is a diol of a C5 or longer alkane. The number of carbon atoms in the alkane is preferably from 5 to 15, more preferably from 6 to 10, even more preferably from 6 to 8. A 1,2-alkanediol is preferred.

A polyol is a polyol of a C4 or shorter alkane or a condensate resulting from intermolecular condensation between hydroxy groups of polyols of a C4 or shorter alkane. The number of carbon atoms in the alkane(s) is preferably 2 or 3. The number of hydroxy groups in the molecule of the polyol is 2 or more, preferably 5 or less, more preferably 3 or less. When the polyol is the aforementioned condensate, the number of intermolecular condensations is 2 or more, preferably 4 or less, more preferably 3 or less. One polyhydric alcohol may be used alone, or two or more may be used as a mixture.

Alkanediols and polyols can function primarily as penetration solvents and/or moisturizing solvents. Alkanediols, however, tend to behave more as penetration solvents, and polyols tend to behave more as moisturizing solvents.

When the treatment liquid and/or aqueous ink composition contains an organic solvent, it/they may contain one organic solvent alone or may contain two or more in combination.

When the treatment liquid and/or aqueous ink composition is/are made using an organic solvent other than nitrogen-containing solvents, the percentage of the organic solvent other than nitrogen-containing solvents to the total mass of the treatment liquid or ink composition is, for the upper limit, preferably 40% by mass or less, more preferably 30% by mass or less, even more preferably 20% by mass or less. As for the lower limit, the percentage is preferably 1% by mass or more, preferably 5% by mass or more, more preferably 7% by mass or more.

When an organic solvent is used in the treatment liquid and/or aqueous ink composition, the total percentage of organic solvents to the total mass of the treatment liquid or ink composition can be 5% by mass or more. However, especially for the treatment liquid, it is preferred that the percentage be 15% by mass or more, more preferably 25% by mass or more, even more preferably 30% by mass or more. This helps further reduce white haze by slowing down the drying of and film formation by the treatment liquid, limiting the separation of the flocculant, and making it more likely that the flocculant forms small crystals even when it crystalizes.

When an organic solvent is used in the treatment liquid and/or aqueous ink composition, the total percentage of organic solvents to the total mass of the treatment liquid or ink composition is preferably 50% by mass or less for the upper limit. It is, however, preferred that the percentage be 45% by mass or less, more preferably 40% by mass or less, so that the drying of the treatment liquid will not be too slow and therefore that the recording will quickly become ready for use.

In the treatment liquid and/or aqueous ink composition, the percentage, to the total mass, of organic solvent polyols that are liquid at 25° C. and have a normal boiling point of 280.0° C. or more is preferably 5.0% by mass or less. The percentage is more preferably 3.0% by mass or less, even more preferably 1.0% by mass or less, in particular 0.5% by mass or less, further preferably 0.3% by mass or less. As for the lower limit, the percentage is 0% by mass or more. That is, the treatment liquid and/or aqueous ink composition may be free of such polyols.

This helps improve the adhesion of the ink to the recording medium by ensuring good drying characteristics of the treatment liquid and/or aqueous ink composition attached to the recording medium. More preferably, the percentage, to the total mass of the treatment liquid or aqueous ink composition, of those organic solvents that are liquid at 25° C. and have a normal boiling point exceeding 280.0° C., whether polyols or not, is in any of the above ranges. Examples of organic solvents having a normal boiling point exceeding 280.0° C. include glycerol and polyethylene glycol monomethyl ether.

1.2.1.2.(3) Surfactant

The treatment liquid and the aqueous ink composition may contain a surfactant. A function of the surfactant is to improve the wettability of the treatment liquid or aqueous ink composition on the recording medium or a substrate by reducing the surface tension of the liquid or composition. Among surfactants, acetylene glycol surfactants, silicone surfactants, and fluorosurfactants are particularly preferred for use.

An acetylene glycol surfactant can be of any kind, but examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; Air Products and Chemicals), OLFINE B, Y, P, A, STG, SPC, E1004, E1010, PD-001, PD-002 W, PD-003, PD-004, EXP. 4001, EXP. 4036, EXP. 4051, AF-103, AF-104, AK-02, SK-14, and AE-3 (all are trade names; Nissin Chemical Industry), and ACETYLENOL E00, E00P, E40, and E100 (all are trade names; Kawaken Fine Chemicals).

A silicone surfactant can be of any kind, but an example of a preferred one is a polysiloxane compound. The polysiloxane compound can be of any kind, but an example is a polyether-modified organosiloxane. Examples of commercially available polyether-modified organosiloxanes include BYK-306, BYK-307, BYK-333, BYK-341, BYK-345, BYK-346, and BYK-348 (all are trade names; BYK Japan) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade names; Shin-Etsu Chemical).

A fluorosurfactant is preferably a fluorine-modified polymer. Specific examples include BYK-3440 (BYK Japan), SURFLON S-241, S-242, and S-243 (AGC Seimi Chemical), and FTERGENT 215M (NEOS).

When the treatment liquid or aqueous ink composition contains a surfactant, it may contain multiple surfactants. The surfactant content of the treatment liquid or aqueous ink composition is preferably 0.1% by mass or more and 2.0% by mass or less, more preferably 0.2% by mass or more and 1.5% by mass or less, even more preferably 0.3% by mass or more and 1.0% by mass or less of the total mass.

1.2.1.2.(4) Excipient

The treatment liquid and the aqueous ink composition may contain a urea, amine, saccharide, or similar substance as an excipient. Examples of ureas include urea, ethylene urea, tetramethylurea, thiourea, 1,3-dimethyl-2-imidazolidinone and similar compounds and betaines (e.g., trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, and acetylcarnitine).

Examples of amines include diethanolamine, triethanolamine, and triisopropanolamine. The urea or amine may also function as a pH modifier.

Examples of saccharides include glucose, mannose, fructose, ribose, xylose, arabinose, galactose, aldonic acid, glucitol (sorbitol), maltose, cellobiose, lactose, sucrose, trehalose, and maltotriose.

1.2.1.2.(5) Resin Particles

The treatment liquid used in the recording method according to this embodiment may contain resin particles. The resin particles can function as a fixing resin, or to improve the adhesion and abrasion resistance of the components of the aqueous ink composition attached to the recording medium. Such resin particles can be, for example, particles of a urethane resin, acrylic resin, fluorene resin, polyolefin resin, rosin-modified resin, terpene resin, polyester resin, polyamide resin, epoxy resin, vinyl chloride resin, or ethylene vinyl acetate resin. These kinds of resin particles are usually handled in emulsion form, but may alternatively be powder. One kind of resin particles or a combination of two or more kinds may be used.

Of kinds of resin particles, cationic resin particles are categorized as flocculants as described above because they function as flocculants. Examples of resin particles intended in this section include ones that are not cationic, such as anionic resin particles and nonionic resin particles.

Examples of anionic resin particles include particles of a resin having an anionic group, and the resin having an anionic group can be any of the resins listed above or below as materials for resin particles. The anionic group can be, for example, a carboxyl or sulfo group.

Examples of nonionic resin particles include particles of a nonionic resin, and the nonionic resin can be any of the resins listed above or below as materials for resin particles. Examples of nonionic resins include resins that have no anionic or cationic group and resins that have a small number of anionic or cationic resins but exhibit nonionic properties.

Urethane resin is a generic term for resins that have the urethane linkage. A urethane resin may be, for example, a polyether urethane resin, which contains, besides the urethane linkage, the ether linkage in its backbone, a polyester urethane resin, which contains the ester linkage in its backbone, or a polycarbonate urethane resin, which contains the carbonate linkage in its backbone. The urethane resin can be a commercially available one. For example, the urethane resin may be selected from commercially available urethane resins including SUPERFLEX 460, 460s, 840, and E-4000 (trade names, DKS Co., Ltd.), RESAMINE D-1060, D-2020, D-4080, D-4200, D-6300, and D-6455 (trade names, Dainichiseika Color & Chemicals Mfg.), Takelac WS-6020, WS-6021, and W-512-A-6 (trade names, Mitsui Chemicals Polyurethanes), Sancure 2710 (trade name, LUBRIZOL), and PERMARIN UA-150 (trade name, Sanyo Chemical Industries).

Acrylic resin is a generic term for polymers obtained by polymerizing at least an acrylic monomer, such as (meth)acrylic acid or a (meth)acrylate, as a component. Examples include resins obtained from an acrylic monomer and copolymers of an acrylic monomer and a different monomer. Examples include acryl-vinyl resins, which are copolymers of an acrylic monomer and a vinyl monomer. Copolymers with styrene or a similar vinyl monomer are another class of examples.

The acrylic monomer can alternatively be, for example, acrylamide or acrylonitrile. A resin emulsion made from an acrylic resin can be a commercially available one. For example, the resin emulsion may be selected from commercially available resin emulsions including FK-854 (trade name, Chuo Rika Kogyo), Mowinyl 952B and 718A (trade names, the Nippon Synthetic Chemical Industry), Nipol LX852 and LX874 (trade names, Zeon), and POLYSOL AT860 (Showa Denko K.K.).

As mentioned above, an acrylic resin herein may be a styrene-acrylic resin. The expression (meth)acrylic herein refers to at least one of acrylic and methacrylic.

A styrene-acrylic resin is a copolymer of a styrene monomer and an acrylic monomer. Examples include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. The styrene-acrylic resin can be a commercially available one. Examples include Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF) and Mowinyl 966A and 975N (trade names, the Nippon Synthetic Chemical Industry).

A vinyl chloride resin may be a vinyl chloride-vinyl acetate copolymer. Examples include . . . .

The resin particles may be non-cohesive particles.

A polyolefin resin is a resin that has an olefin, such as ethylene, propylene, or butylene, as its structural backbone and can be a suitable one selected from known polyolefin resins. The olefin resin can be a commercially available one.

For example, the olefin resin may be selected from commercially available olefin resins including ARROWBASE CB-1200 and CD-1200 (trade names, UNITIKA Ltd.).

The resin particles, moreover, may be supplied in emulsion form. Examples of a commercially available collection of such resin emulsions include MICROGEL E-1002 and E-5002 (trade names of Nippon Paint products, styrene-acrylic resin emulsions), VONCOAT 4001 (trade name of a DIC product, an acrylic resin emulsion), VONCOAT 5454 (trade name of a DIC product, a styrene-acrylic resin emulsion), POLYSOL AM-710, AM-920, AM-2300, AP-4735, AT-860, and PSASE-4210E (acrylic resin emulsions), POLYSOL AP-7020 (styrene-acrylic resin emulsion), POLYSOL SH-502 (vinyl acetate resin emulsion), POLYSOL AD-13, AD-2, AD-10, AD-96, AD-17, and AD-(ethylene-vinyl acetate resin emulsions), POLYSOL PSASE-6010 (ethylene-vinyl acetate resin emulsion) (trade names of Showa Denko products), POLYSOL SAE1014 (trade name, a styrene-acrylic resin emulsion, Zeon), SAIVINOL SK-200 (trade name, an acrylic resin emulsion, Saiden Chemical Industry), AE-120A (trade name of a JSR product, an acrylic resin emulsion), AE373D (trade name of an Emulsion Technology product, a carboxy-modified styrene-acrylic resin emulsion), SEIKADYNE 1900 W (trade name of a Dainichiseika Color & Chemicals Mfg. product, an ethylene-vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion) (trade names of Nissin Chemical Industry products), VINYBLAN 700 and 2586 (Nissin Chemical Industry), elitel KA-5071S, KT-8803, KT-9204, KT-8701, KT-8904, and KT-0507 (trade names of Unitika products, polyester resin emulsions), Hytec SN-2002 (trade name of a Toho Chemical product, a polyester resin emulsion), Takelac W-6020, W-635, W-6061, W-605, W-635, and W-6021 (trade names of Mitsui Chemicals Polyurethanes products, urethane resin emulsions), SUPERFLEX 870, 800, 150, 420, 460, 470, 610, 620, and 700 (trade names of DKS products, urethane resin emulsions), PERMARIN UA-150 (Sanyo Chemical Industries, a urethane resin emulsion), Sancure 2710 (Lubrizol Japan, a urethane resin emulsion), NeoRez R-9660, R-9637, and R-940 (Kusumoto Chemicals Ltd., urethane resin emulsions), ADEKA BONTIGHTER HUX-380 and 290K (ADEKA Corporation, urethane resin emulsions), Mowinyl 966A and Mowinyl 7320 (the Nippon Synthetic Chemical Industry), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (BASF), NK Binder R-5HN (Shin-Nakamura Chemical Co., Ltd.), HYDRAN WLS-210 (non-crosslinked polyurethane, DIC Corporation), and Joncryl 7610 (BASF).

When the treatment liquid contains resin particles, their percentage is 0.1% by mass or more and 20% by mass or less, preferably 1% by mass or more and 15% by mass or less, more preferably 2% by mass or more and 10% by mass or less of the total mass of the treatment liquid on a solids basis.

The presence of resin particles in the treatment liquid is preferred in that, for example, it provides superb abrasion resistance of the recording. The resin particles, however, have been dispersed, and this means the dispersion stability of the resin particles is a consideration. The coexistence of resin particles with the flocculant in the treatment liquid can affect the dispersion stability of the resin particles. Reduced ejection stability of resin particles can cause reduced stability when the treatment liquid is ejected from a recording head. Circulating the treatment liquid using a recording head having a circulation channel is preferred in that it provides superb ejection stability.

Of kinds of resin particles, nonionic resin particles are preferred because they provide better ejection stability. When resins including an anionic resin and a nonionic resin are resin particles, moreover, these nonionic and anionic resins do not function as flocculants but can cause extreme flocculation by interacting. In such a case, therefore, the circulation of the treatment liquid in a circulation channel according to this embodiment becomes more advantageous.

Furthermore, it is preferred that the resin particles be particles of a urethane resin and/or a vinyl chloride resin. This helps further improve the adhesion and abrasion resistance of the components of the aqueous ink composition attached to the recording medium. A urethane resin is particularly preferred.

Preferably, the resin forming the resin particles has a glass transition temperature of 100.0° C. or less. This provides superior abrasion resistance by helping the resin form film on the recording medium and ensuring superior adhesion. It is more preferred that the glass transition temperature be 90.0° C. or less, even more preferably 80.0° C. or less, in particular 70.0° C. or less.

The glass transition temperature, however, is preferably −60.0° C. or more. This provides superior abrasion resistance by ensuring high hardness on the recording medium. It is more preferred that the glass transition temperature be 0.0° C. or more, even more preferably 20.0° C. or more, still more preferably 40.0° C. or more, further preferably 45.0° C. or more, in particular 50.0° C. or more. Such a glass transition temperature is also preferred in that it provides better ejection stability of the treatment liquid. With such a glass transition temperature, the resin particles in the treatment liquid are less likely to fuse, and, therefore, the resin is less likely to grow huge. The glass transition temperature (Tg) of a resin forming resin particles can be determined by measurement, for example using differential scanning calorimetry (DSC).

Resin

The treatment liquid may contain a resin. The resin can be, for example, a cationic resin as a flocculant or resin particles both as described above. Alternatively, the resin may be a water-soluble anionic or nonionic resin.

A resin in the treatment liquid can affect ejection stability by causing thickening when the treatment liquid dries at nozzles. In such a case, circulation using a recording head having a circulation channel is preferred because it provides better ejection stability. This embodiment is highly beneficial especially when the resin is a cationic polymer as a flocculant or resin particles. Image quality will be superb in the former case, abrasion resistance will be superb in the latter case, and ejection stability will be superior in either case.

1.2.1.2.(6) Others

The treatment liquid and the aqueous ink composition used in the ink jet recording method according to this embodiment may optionally contain ingredients such as a preservative/antimold, an antirust, a chelating agent, a viscosity modifier, an antioxidant, and a fungicide.

1.2.2. Characteristics of the Treatment Liquid and Attachment to a Recording Medium The treatment liquid preferably has a surface tension at 25.0° C. of 40.0 mN/m or less, more preferably 38.0 mN/m or less, even more preferably 35.0 mN/m or less, still more preferably 30.0 mN/m or less. This ensures moderate wetting and spread on the recording medium.

In the ink jet recording method according to this embodiment, the treatment liquid is attached to the recording medium by an ink jet process using a recording apparatus that has a recording head having a circulation channel. Thus, it is preferred that the viscosity of the treatment liquid at 20.0° C. be 1.5 mPa·s or more and 15.0 mPa·s or less, more preferably 1.5 mPa·s or more and 5.0 mPa·s or less, even more preferably 1.5 mPa·s or more and 3.6 mPa·s or less. By virtue of the use of an ink jet process to attach the treatment liquid to the recording medium, it is easy to coat a predetermined area of the recording medium with the treatment liquid efficiently. The details of the ink jet process are given below.

1.3. Ink Attachment Step

The ink jet recording method according to this embodiment includes an ink attachment step, in which an aqueous ink composition is attached to the recording medium.

1.3.1. Aqueous Ink Composition

The aqueous ink composition contains at least water, a colorant, and resin particles. The water and the resin particles are as described in "1.2.1.2.(1) Water" and "1.2.1.2.(5) Resin Particles" and are not discussed again. Read the words "treatment liquid" as "aqueous ink composition" in those sections.

1.3.1.(1) Colorant

The aqueous ink composition contains a colorant. The colorant can be a pigment or dye, and examples of colorants that can be used include inorganic pigments such as carbon black and titanium white, organic pigments, solvent dyes, acidic dyes, direct dyes, reactive dyes, basic dyes, disperse dyes, and sublimation dyes. In the ink in this embodiment, the colorant may be dispersed with a dispersing resin.

Examples of inorganic pigments that can be used include carbon black (C.I. Pigment Black 7) pigments, such as furnace black, lamp black, acetylene black, and channel black, iron oxide, titanium oxide, zinc oxide, and silica.

Examples of carbon black pigments include Mitsubishi Chemical Corporation's No. 2300, 900, MCF88, No. 20B, No. 33, No. 40, No. 45, No. 52, MA7, MA8, MA100, and No. 2200B. Other examples include Degussa's Color Black FW1, FW2, FW2V, FW18, FW200, S150, S160, and S170, Printex 35, U, V, and 140U, and Special Black 6, 5, 4A, 4, and 250, Columbian Carbon's Conductex SC and Raven 1255, 5750, 5250, 5000, 3500, 1255, and 700, and Cabot's REGAL 400R, 330R, and 660R, MOGUL L, MONARCH 700, 800, 880, 900, 1000, 1100, β00, and 1400, and ELFTEX 12.

Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Specific examples of organic pigments that can be used in the aqueous ink composition include the following.

For cyan pigments, examples include C.I. Pigment Blue pigments, such as C.I. Pigment Blue 1, 2, 3, 15:3, 15:4, 15:34, 16, 22, and 60; and C.I. Vat Blue pigments, such as C.I. Vat Blue 4 and 60. An example of a preferred cyan pigment is one or a mixture of two or more selected from the group consisting of C.I. Pigment Blue 15:3, 15:4, and 60.

For magenta pigments, examples include C.I. Pigment Red 5, 7, 12, 48 (Ca), 48 (Mn), 57 (Ca), 57:1, 112, 122, 123, 168, 184, and 202 and C.I. Pigment Violet 19. An example of a preferred magenta pigment is one or a mixture of two or more selected from the group consisting of C.I. Pigment Red 122, 202, and 209 and C.I. Pigment Violet 19.

For yellow pigments, examples include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. An example of a preferred yellow pigment is one or a mixture of two or more selected from the group consisting of C.I. Pigment Yellow 74, 109, 110, 128, and 138.

An orange pigment can be, for example, C.I. Pigment Orange 36 or 43 or a mixture of them. A pigment in a green ink can be, for example, C.I. Pigment Green 7 or 36 or a mixture of them.

These pigments listed by way of example are examples of preferred pigments and do not limit any aspect of the present disclosure. One of these pigments or a mixture of two or more may be used. These pigments, moreover, may be used in combination with dye(s).

The pigment may be dispersed before use with a dispersant selected from, for example, water-soluble resins, water-dispersible resins, and surfactants. Alternatively, the surface of the pigment may be oxidized or sulfonated, for example with ozone, hypochlorous acid, or fuming sulfuric acid, to make the pigment self-dispersible before use.

When a pigment in the ink in this embodiment is dispersed with a dispersing resin, the ratio between the pigment and the dispersing resin is preferably from 10:1 to 1:10, more preferably from 4:1 to 1:3. The dispersed pigment has a maximum particle diameter of less than 500 nm and a volume-average particle diameter of 300 nm or less as measured by dynamic light scattering. More preferably, the volume-average particle diameter is 200 nm or less.

Examples of dyes that can be used in the aqueous ink composition include water-soluble dyes, such as acidic dyes, direct dyes, reactive dyes, and basic dyes, and water-dispersible dyes, such as disperse dyes, solvent dyes, and sublimation dyes.

Examples of acidic dyes include C.I. Acid Yellow 17, 23, 42, 44, 79, and 142, C.I. Acid Red 52, 80, 82, 249, 254, and 289, C.I. Acid Blue 9, 45, and 249, and C.I. Acid Black 1, 2, 24, and 94.

Examples of direct dyes include C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, and 195, and C.I. Direct Blue 2, 3, 8, 10, 12, 31, 35, 63, 116, 130, 149, 199, 230, and 231.

Examples of reactive dyes include C.I. Reactive Yellow 2, 7, 15, 22, 37, 42, 57, 69, 76, 81, 95, 102, 125, and 135, C.I. Reactive Red 2, 14, 24, 32, 55, 79, 106, 111, and 124, C.I. Reactive Blue 2, 13, 21, 38, 41, 50, 69, 72, 109, 120, and 143, and C.I. Reactive Black 3, 4, 5, 8, 13, 14, 31, 34, 35, and 39.

Examples of basic dyes include C.I. Basic Yellow 1, 2, 13, 19, 21, 25, 32, 36, 40, and 51, C.I. Basic Red 1, 5, 12, 19, 22, 29, 37, 39, and 92, C.I. Basic Blue 1, 3, 9, 11, 16, 17, 24, 28, 41, 45, 54, 65, and 66, and C.I. Basic Black 2 and 8.

As for disperse dyes and solvent dyes, any colorant can be used that does not dissolve but disperses in the ink vehicle. Examples include azo dyes, metal complex azo dyes, anthraquinone dyes, phthalocyanine dyes, and triarylmethane dyes.

Examples of disperse dyes include C.I. Disperse Red 60, 82, 86, 86:1, 167:1, and 279, C.I. Disperse Yellow 64, 71, 86, 114, 153, 233, and 245, C.I. Disperse Blue 27, 50, 73, 77, 77:1, 87, 257, and 367, C.I. Disperse Violet 26, 33, 36, and 57, and C.I. Disperse Orange 30, 41, and 61.

Examples of solvent dyes include C.I. Solvent Yellow 16, 21, 25, 29, 33, 51, 56, 82, 88, 89, 150, and 163, C.I. Solvent Red 7, 8, 18, 24, 27, 49, 109, 122, 125, 127, 130, 132, 135, 218, 225, and 230, C.I. Solvent Blue 14, 25, 35, 38, 48, 67, 68, 70, and 132, and C.I. Solvent Black 3, 5, 7, 27, 28, 29, and 34.

A sublimation dye can be a disperse dye, solvent dye, or any other dye that has the nature mentioned above. Specific examples of such dyes include C.I. Disperse Yellow 3, 7, 8, 23, 39, 51, 54, 60, 71, and 86; C.I. Disperse Orange 1, 1:1, 5, 20, 25, 25:1, 33, 56, and 76; C.I. Disperse Brown 2; C.I. Disperse Red 11, 50, 53, 55, 55:1, 59, 60, 65, 70, 75, 93, 146, 158, 190, 190:1, 207, 239, and 240; C.I. Vat Red 41; C.I. Disperse Violet 8, 17, 23, 27, 28, 29, 36, and 57; C.I. Disperse Blue 19, 26, 26:1, 35, 55, 56, 58, 64, 64:1, 72, 72:1, 81, 81:1, 91, 95, 108, 131, 141, 145, and 359; and C.I. Solvent Blue 36, 63, 105, and 111. One of these may be used alone, or two or more may be used in combination.

These dyes listed by way of example are examples of preferred colorants and do not limit any aspect of the present disclosure. One of these dyes or a mixture of two or more may be used. These dyes, moreover, may be used in combination with pigment(s).

The colorant content can be adjusted to be appropriate for the intended purpose of use. Preferably, the colorant content is 0.10% by mass or more and 20.0% by mass or less, more preferably 0.20% by mass or more and 15.0% by mass or less, even more preferably 1.0% by mass or more and 10.0% by mass or less.

When the colorant is a pigment, the volume-average diameter of the pigment particles (before mixing with the treatment liquid) is preferably 10.0 nm or more and 200.0 nm or less, more preferably 30.0 nm or more and 200.0 nm or less, even more preferably 50.0 nm or more and 150.0 nm or less, in particular 70.0 nm or more and 120.0 nm or less.

1.3.1.(2) Extra Ingredients

Besides the water and colorant, the aqueous ink composition may contain ingredients such as a dispersant, an organic solvent, a surfactant, a wax, an excipient, a preservative/antimold, an antirust, a chelating agent, a viscosity modifier, an antioxidant, and a fungicide unless its functions are impaired. Of these, the organic solvent, surfactant, and excipient are as described above for the treatment liquid and are not discussed again.

(1) Dispersant

The aqueous ink composition in this embodiment may contain a dispersant for water-insoluble substances, such as a pigment or disperse dye. A function of the dispersant is to disperse water-insoluble colorant(s) in the ink. The dispersant can be of any kind, but examples include anionic dispersants, nonionic dispersants, and polymer dispersants (also called resin dispersants, dispersing resins, etc.).

An example of a preferred anionic dispersant is a formalin condensate of an aromatic sulfonic acid. Examples of the "aromatic sulfonic acid" in the formalin condensate of an aromatic sulfonic acid include creosote oil sulfonic acid, cresol sulfonic acid, phenol sulfonic acid, β-naphthol sulfonic acid, alkylnaphthalene sulfonic acids, such as methylnaphthalene sulfonic acid and butylnaphthalene sulfonic acid, mixtures of β-naphthalene sulfonic acid and β-naphthol sulfonic acid, mixtures of cresol sulfonic acid and 2-naphthol-6-sulfonic acid, and lignin sulfonic acid and its salts.

Preferably, the anionic dispersant is a formalin condensate of β-naphthalene sulfonic acid, a formalin condensate of an alkylnaphthalene sulfonic acid, or a formalin condensate of creosote oil sulfonic acid or its salt, more preferably a sodium salt.

Examples of nonionic surfactants include ethylene oxide adducts of phytosterol and ethylene oxide adducts of cholestanol.

Of these, examples of commercially available naphthalene sulfonic acid dispersants include DEMOL NL (naphthalene sulfonic acid, Kao Corporation), DEMOL MS, DEMOL N, DEMOL RN, DEMOL RN-L, DEMOL SC-30, DEMOL SN-B, DEMOL SS-L, DEMOL T, and DEMOL T-45.

Examples of polymer dispersants (also called "resin dispersants") include water-soluble resins, such as (meth)acrylic resins and their salts, the resins including poly(meth)acrylic acid, (meth)acrylic acid-acrylonitrile copolymers, (meth)acrylic acid-(meth)acrylate copolymers, vinyl acetate-(meth)acrylate copolymers, vinyl acetate-(meth)acrylic acid copolymers, and vinylnaphthalene-(meth)acrylic acid copolymers; styrene resins and their salts, the resins including styrene-(meth)acrylic acid copolymers, styrene-(meth)acrylic acid copolymers, styrene-(meth)acrylic acid-(meth)acrylate copolymers, styrene-α-methylstyrene-(meth)acrylic acid copolymers, styrene-α-methylstyrene-(meth)acrylic acid-(meth)acrylate copolymers, styrene-maleic acid copolymers, and styrene-maleic anhydride copolymers; urethane resins and their salts, the urethane resins being polymeric compounds (resins) that contain urethane linkages resulting from the reaction between isocyanate groups and hydroxyl groups and may be linear and/or branched, with or without a crosslink structure; polyvinyl alcohols; vinylnaphthalene-maleic acid copolymers and their salts; vinyl acetate-maleate copolymers and their salts; and vinyl acetate-crotonic acid copolymers and their salts.

Examples of commercially available styrene-based resin dispersants include X-200, X-1, X-205, X-220, and X-228 (Seiko PMC), SN-DISPERSANT® 6100 and 6110 (San Nopco Ltd.), Joncryl 67, 586, 611, 678, 680, 682, and 819 (BASF), DISPERBYK-190 (BYK Japan K.K.), and N-EA137, N-EA157, N-EA167, N-EA177, N-EA197D, N-EA207D, and E-EN10 (DKS).

Examples of commercially available acrylic resin dispersants include BYK-187, BYK-190, BYK-191, BYK-194N, and BYK-199 (BYK) and Aron A-210, A6114, AS-1100, AS-1800, A-30SL, A-7250, and CL-2 (Toagosei Co., Ltd.).

Examples of commercially available urethane-based resin dispersants include BYK-182, BYK-183, BYK-184, and BYK-185 (BYK), TECO Disperse 710 (Evonik Tego Chemie), Borchi® Gen 1350 (OMG Borchers).

One dispersant may be used alone, or two or more may be used in combination. The total dispersant content is 0.1% by mass or more and 30% by mass or less, preferably 0.5% by mass or more and 25% by mass or less, more preferably 1% by mass or more and 20% by mass or less, even more preferably 1.5% by mass or more and 15% by mass or less, with the mass of the ink as 100%. A dispersant content of 0.1% by mass or more helps ensure the dispersion stability of the colorant. A dispersant content of 30% by mass or less ensures that the colorant is not dissolved excessively, and the viscosity is kept low.

Of these dispersants listed by way of example, it is particularly preferred that the dispersant(s) be resin dispersant(s), in particular at least one selected from acrylic resins, styrene resins, and urethane resins. More preferably, the weight-average molecular weight of the dispersant(s) is 500 or more. Such resin dispersants are relatively odorless and help further improve the dispersion stability of the colorant.

(2) Wax

The aqueous ink composition may contain wax. Since the wax described in this section can be used in non-white inks, the description in this section includes different preferences for selection, percentage, etc. The presence of wax is also allowed in the treatment liquid, but preferably the treatment liquid is wax-free because wax can cause flocculation and/or thickening. With its function of giving lubricity to the ink image, the wax helps reduce, for example, the detachment of the ink image.

The wax can be, for example, a vegetable/animal wax, such as carnauba wax, candelilla wax, beeswax, rice bran wax, or lanolin; a petroleum wax, such as paraffin wax, microcrystalline wax, polyethylene wax, oxidized polyethylene wax, or petrolatum; a mineral wax, such as montan wax or ozokerite; or a synthetic wax, such as carbon wax, hoechst wax, a polyolefin wax, or a stearic acid amide, a natural/synthetic wax emulsion, such as an α-olefin-maleic anhydride copolymer, or a compound wax or a mixture of two or more such waxes. Of these, it is particularly preferred to use a polyolefin wax (in particular, polyethylene wax or polypropylene wax) and paraffin wax. They are more effective than others in improving fixation on a flexible packaging film.

It is also possible to use a commercially available wax as it is. Examples include NOPCOTE PEM-17 (trade name, San Nopco Ltd.), CHEMIPEARL W4005 (trade name, Mitsui Chemicals, Inc.), and AQUACER 515, 539, and 593 (trade names, BYK Japan K.K.).

When the ink jet recording method includes a heating step, excessive melting of the wax may affect its performance. It is therefore preferred that the melting point of the wax be 50.0° C. or more and 200.0° C. or less, more preferably 70.0° C. or more and 180.0° C. or less, even more preferably 90.0° C. or more and 150.0° C. or less.

The wax may be supplied in emulsion or suspension form. The wax content is 0.1% by mass or more and 10.0% by mass or less, preferably 0.5% by mass or more and 5.0% by mass or less, more preferably 0.5% by mass or more and 2.0% by mass or less of the total mass of the ink on a solids basis. The aforementioned function of the wax is highly effective when the wax content is in any of these ranges. It is enough that the wax is contained in one or both of the white and non-white inks for its function of giving lubricity to the image to be sufficiently effective.

1.3.2. Attachment of the Aqueous Ink Composition to the Recording Medium

The aqueous ink composition is attached to the recording medium by an ink jet process (ink composition attachment step). Thus, it is preferred that the viscosity of the aqueous ink composition be 1.5 mPa·s or more and 15.0 mPa·s or less, more preferably 1.5 mPa·s or more and 7.0 mPa·s or less, even more preferably 1.5 mPa·s or more and 5.5 mPa·s or less at 20° C. By virtue of the use of an ink jet process to attach the aqueous ink composition to the recording medium, it is easy to form a predetermined image on the recording medium efficiently. The recording head used in attaching the ink composition to the recording medium may have a circulation channel in which the ink composition is circulated or may have no such circulation channel. A recording head having a circulation channel, however, is preferred in that it provides better ejection stability, for example, of the ink composition. The details of the ink jet process are given below.

The aqueous ink composition used in the ink jet recording method according to this embodiment preferably has a surface tension at 25.0° C. of 40.0 mN/m or less, more preferably 38.0 mN/m or less, even more preferably 35.0 mN/m or less, still more preferably 30.0 mN/m or less. This ensures moderate wetting and spread on the recording medium.

In the aqueous ink composition attachment step, the recording zone, the zone of the recording medium to which both of the treatment liquid and the ink composition are attached, preferably has a region in which the amount of attached aqueous ink composition is from 5 to 25 mg/inch$^2$. It is more preferred that the recording zone have a region in which the amount of attached ink composition is from 7 to 20 mg/inch$^2$, even more preferably from 10 to 15 mg/inch$^2$. Preferably, the region with such an amount of attached ink composition is the region with the largest amount of attached aqueous ink composition in the recording zone, the zone of the recording medium to which both of the treatment liquid and the ink composition are attached. This advantageously helps produce a highly useful recording.

In the treatment liquid attachment step, the recording zone, the zone of the recording medium to which both of the treatment liquid and the ink composition are attached, preferably has a region in which the amount of attached treatment liquid is from 3% to 50% by mass of that of attached ink composition. It is more preferred that the recording zone have a region in which the proportion of the amount of attached treatment liquid to that of attached ink composition is from 5% to 40% by mass, even more preferably from 7% to 30% by mass. The proportion of the amount of attached treatment liquid to that of attached ink composition is more preferably 10% by mass or more, even more preferably 15% by mass or more, still more preferably 20% by mass or more.

Preferably, the region with such an amount of treatment liquid attached is the region with the largest amount of aqueous ink composition attached in the recording zone, the zone of the recording medium to which both of the treatment liquid and the ink composition are attached. This advantageously provides better image quality and abrasion resistance.

1.4. Ink Jet Recording Apparatus

An ink jet recording apparatus according to this embodiment includes a recording head. The recording has a circulation channel in which a treatment liquid as described above is circulated, and ejects the treatment liquid and attaches it to a recording medium. The ink jet recording apparatus ejects a treatment liquid and an aqueous ink composition, both as described above, from the recording head and attaches them to the recording medium.

1.4.1. Overview of the Ink Jet Recording Apparatus

The following describes, with reference to drawings, an example of an ink jet recording apparatus with which the ink jet recording method according to this embodiment is performed. The ink jet recording apparatus with which the ink jet recording method according to this embodiment is performed carries out the treatment liquid attachment step and the ink attachment step through multiple main scans, in which a recording head moves in a main scanning direction, and multiple sub-scans, in which the recording medium moves in a sub-scanning direction, which crosses the main scanning direction. The recording head has a first ejecting nozzle group, which includes a line of nozzles arranged in the sub-scanning direction and ejects a treatment liquid, and a second ejecting nozzle group, which includes a line of nozzles arranged in the sub-scanning direction and ejects an aqueous ink composition. The first and second ejecting nozzle groups overlap when projected in the main scanning direction. In the drawings referenced in the following description, the scale may vary from element to element so that each element is recognizable.

Figure 2:
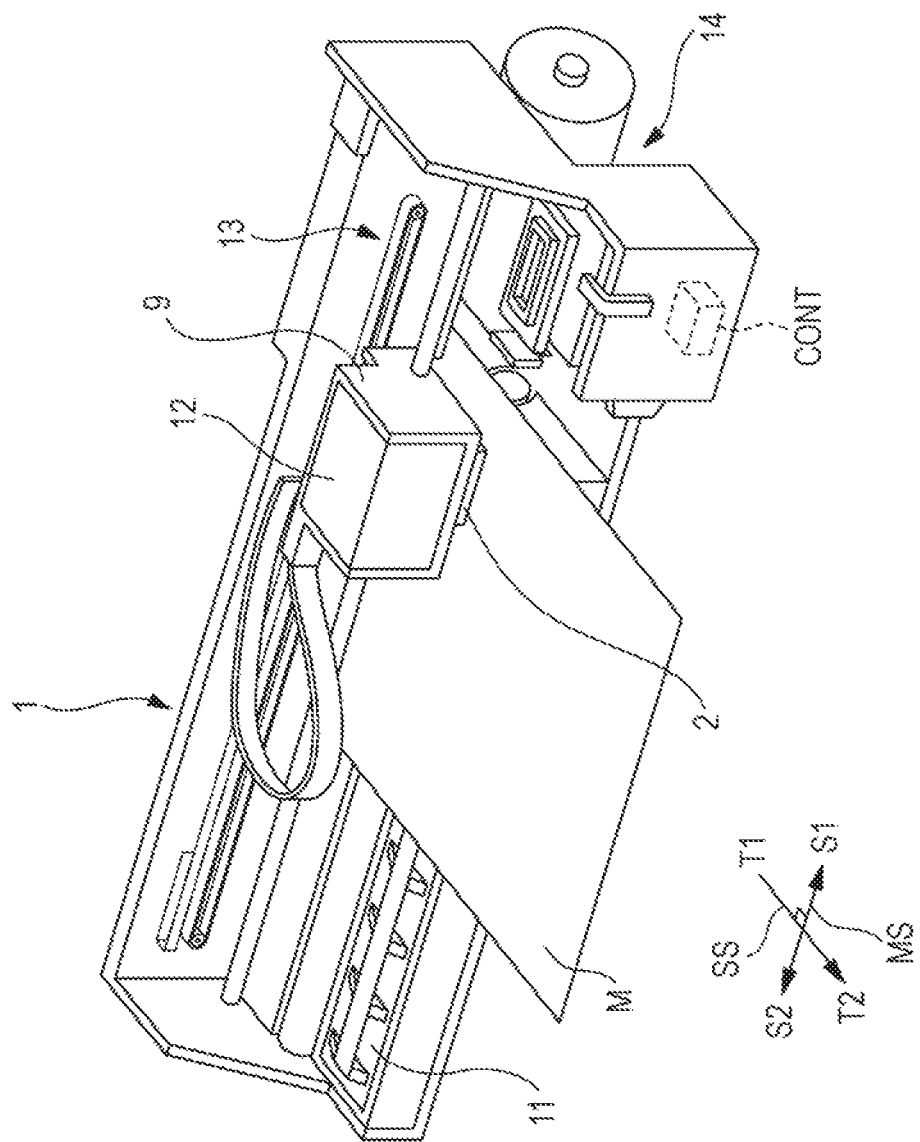
FIG. 2 is an outline illustration of a carriage and its surroundings in an example of an ink jet recording apparatus for use in an ink jet recording method according to an embodiment.

FIG. 1 is an outline cross-sectional diagram schematically illustrating the ink jet recording apparatus 1. FIG. 2 is a perspective view of a carriage and its surroundings in their exemplary configuration in the ink jet recording apparatus 1 illustrated in FIG. 1. As illustrated in FIGS. 1 and 2, the ink jet recording apparatus 1 has a recording head 2, an IR heater 3, a platen heater 4, a heating heater 5, a cooling fan 6, a preheater 7, an aeration fan 8, a carriage 9, a platen 11, a carriage-moving mechanism 13, a transporter 14, and a control section CONT. The control section CONT, illustrated in FIG. 2, controls the overall operation of the ink jet recording apparatus 1.

The recording head 2 produces a recording on a recording medium M by ejecting an ink and a treatment liquid from nozzles of the recording head 2 and attaching them to the recording medium M. In this embodiment, the recording head 2 is a serial recording head. It therefore attaches the ink and treatment liquid to the recording medium M by making multiple scans relative to the recording medium M in a main scanning direction. The recording head 2 is on the carriage 9, illustrated in FIG. 2. What drives the scans of the recording head 2 relative to the recording medium M in the main scanning direction is the operation of the carriage-moving mechanism 13, which moves the carriage 9 in the direction of medium width, or along the width of the recording medium M. The direction of medium width is the main scanning direction, or the direction in which the recording head 2 scans. A scan in the main scanning direction is also referred to as a main scan.

The main scanning direction is also the direction in which the carriage 9 moves with the recording head 2 thereon. In FIG. 1, the main scanning direction is the direction that crosses the direction of transport of the recording medium M, or a sub-scanning direction, indicated by the arrow SS. In FIG. 2, the direction along the width of the recording medium M, i.e., the direction S1-S2, is the main scanning direction MS, and the direction represented by T1→T2 is the sub-scanning direction SS. One scan is a one-way scan in the main scanning direction, i.e., in the direction of arrow S1 or S2. A main scan, of the recording head 2, and a sub-scan, which is the transport of the recording medium M, are repeated to produce a recording on the recording medium M. That is, the treatment liquid attachment step and the ink attachment step are performed through multiple main scans, in which a recording head 2 moves in a main scanning direction, and multiple sub-scans, in which the recording medium M moves in a sub-scanning direction, which crosses the main scanning direction.

The cartridge 12, which supplies the ink and treatment liquid to the recording head 2, includes multiple independent cartridges. The cartridge 12 has been detachably attached to the carriage 9 carrying the recording head 2 thereon. Each of the multiple cartridges are filled with a different aqueous ink composition or treatment liquid, and the cartridge 12 supplies an aqueous ink composition and a treatment liquid to the corresponding nozzles. Although the cartridge 12 in this embodiment is on the carriage 9, this is not the only possible configuration. The cartridge may be somewhere other than the carriage 9, and the liquid supply to the nozzles may be achieved through supply piping not illustrated.

Any known technology can be used to make the recording head 2 perform its ejection task. In this embodiment, vibrations of piezoelectric elements are used to eject droplets. That is, mechanical deformation of electrostrictive elements is used to form ink droplets.

The ink jet recording apparatus 1 has an IR heater and a platen heater 4, both for heating the recording medium M during the ejection of the aqueous ink composition and/or treatment liquid from the recording head 2. When a drying step is performed to dry the recording medium M in this embodiment, the IR heater 3 and the undermentioned aeration fan 8, for example, can be used.

By using the IR heater 3, the recording medium M can be heated from the recording head 2 side with radiant infrared heat, or by radiation heating. It often heats the recording head 2, too, but with less influence of the thickness of the recording medium M than with heating from the back of the recording medium M, for example with the platen heater 4. The ink jet recording apparatus 1 may include a fan that dries the ink and/or treatment liquid on the recording medium M by blowing warm air or air at the surrounding temperature to the recording medium M (e.g., the aeration fan 8).

The platen heater 4 is positioned opposite the recording head 2 and is capable of heating the recording medium M there with a platen 11 therebetween to ensure that the treatment liquid and aqueous ink composition ejected from the recording head 2 can be dried early after being attached to the recording medium M. The platen heater 4 is capable of conduction heating of the recording medium M, and the ink jet recording method according to this embodiment can be performed with or without using it. When used, the platen heater 4 is preferably controlled to make the surface temperature of the recording medium M 40.0° C. or less.

The surface temperature to which the recording medium M is heated by the IR heater 3 and the platen heater 4 is preferably, for the upper limit, 45.0° C. or less, more preferably 40.0° C. or less, even more preferably 38.0° C. or less, in particular 35.0° C. or less. As for the lower limit, the surface temperature of the recording medium M is preferably 25.0° C. or more, more preferably 28.0° C. or more, even more preferably 30.0° C. or more, in particular 32.0° C. or more. This helps limit the drying and chemical alteration of the aqueous ink compositions and treatment liquids in the recording head 2, thereby helping prevent the deposition of the aqueous ink compositions and resins on the inner walls of the recording head 2. Such a surface temperature of the recording medium M also encourages early fixation of the aqueous ink composition and/or treatment liquid on the recording medium, thereby helping improve image quality.

The heating heater 5 is a heater that dries and solidifies the aqueous ink composition attached to the recording medium M, i.e., a heater for secondary heating or secondary drying. The heating heater 5 can be used in a postheating step. The heating heater 5 heats the recording medium M with a recorded image thereon. As a result, the water, for example, in the aqueous ink composition evaporates away quickly, leaving an ink film formed by the resin contained in the aqueous ink composition. The heating heater 5 therefore makes the ink jet recording apparatus 1 superior in film formation by ensuring that an ink film becomes firmly fixed on or adheres firmly to the recording medium M, thereby helping produce a good and high-quality image in a short time. The surface temperature to which the recording medium M is heated by the heating heater 5 is preferably, for the upper limit, 120.0° C. or less, more preferably 100.0° C. or less, even more preferably 90.0° C. or less. As for the lower limit, the surface temperature of the recording medium M is preferably 60.0° C. or more, more preferably 70.0° C. or more, even more preferably 80.0° C. or more. A surface temperature in any of these ranges helps produce a high-quality image in a short time.

The ink jet recording apparatus 1 may have a cooling fan 6. By drying the aqueous ink composition attached to the recording medium M and then cooling the ink on the recording medium M with the recording fan 6, a highly adhesive ink coating can be formed on the recording medium M.

The ink jet recording apparatus 1, moreover, may include a preheater 7 that heats the recording medium M in advance of the attachment of the aqueous ink composition to the recording medium M. Furthermore, the ink jet recording apparatus 1 may include an aeration fan 8 so that the aqueous ink composition and/or treatment liquid attached to the recording medium M can be dried more efficiently.

Under the carriage 9 are a platen 11 that supports the recording medium M, a carriage-moving mechanism 13 that moves the carriage 9 relative to the recording medium M, and a transporter 14 that is rollers that transport the recording medium M in the sub-scanning direction. The operation of the carriage-moving mechanism 13 and that of the transporter 14 are controlled by the control section CONT.

Figure 3:
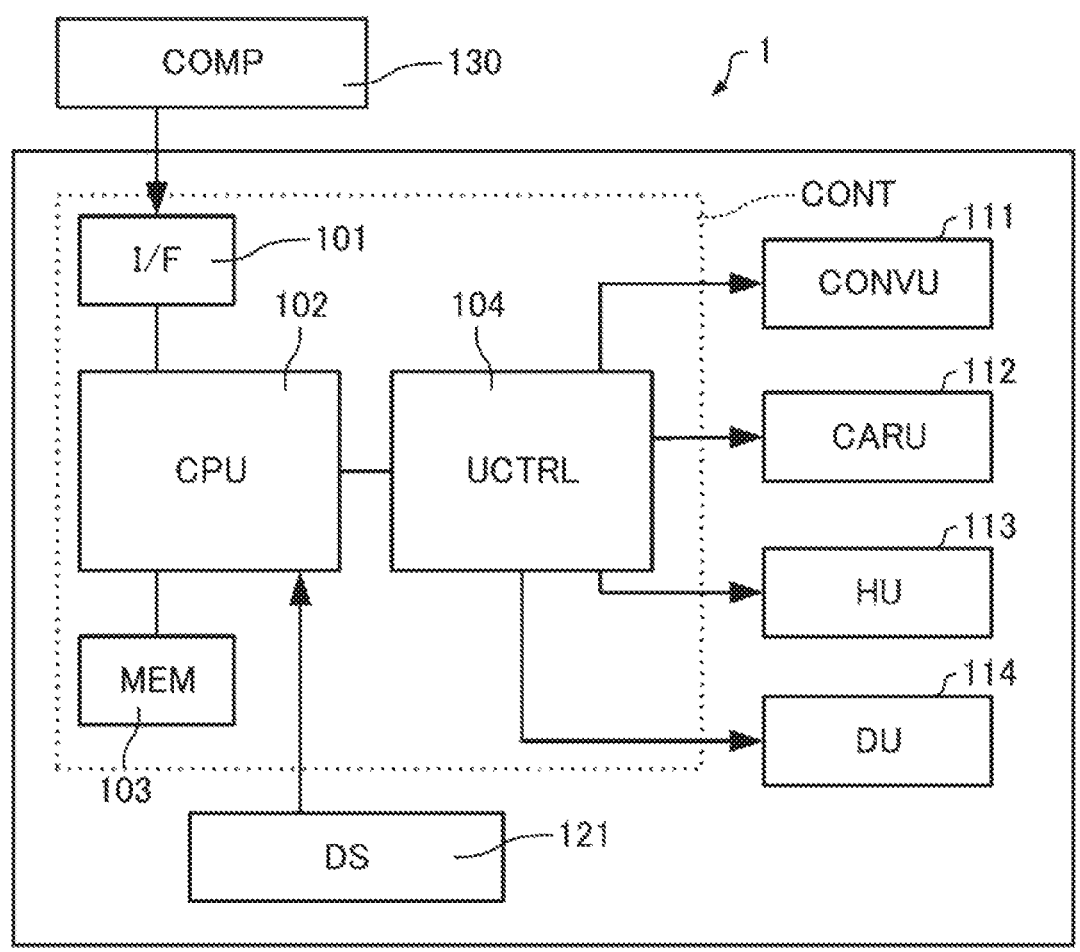
FIG. 3 is a block diagram for an example of an ink jet recording apparatus for use in an ink jet recording method according to an embodiment.

FIG. 3 is a functional block diagram for the ink jet recording apparatus 1. The control section CONT is a control unit for controlling the ink jet recording apparatus 1. The interface 101 (I/F) is for exchanging data between a computer 130 (COMP) and the ink jet recording apparatus 1. The CPU 102 is a processing unit for controlling the entire ink jet recording apparatus 1. The memory 103 (MEM) is for, for example, storing programs and providing workspace for the CPU 102. The CPU 102 controls each unit via a unit control circuit 104 (UCTRL). The internal status of the ink jet recording apparatus 1 is monitored by a set of detectors 121 (DS), and the control section CONT controls each unit based on detected events.

The transport unit 111 (CONVU) controls sub-scans (transport) in ink jet recording, specifically the rate and direction of transport of the recording medium M. Specifically, the transport unit 111 controls the rate and direction of transport of the recording medium M by controlling the rate and direction of rotation of motor-driven transport rollers.

The carriage unit 112 (CARU) controls main scans (passes) in ink jet recording, or specifically moves the recording head 2 back and forth in the main scanning direction. The carriage unit 112 includes a carriage 9 for the recording head 2 and a carriage-moving mechanism 13 for moving the carriage 9 back and forth.

The head unit 113 (HU) controls the volume of treatment liquid or aqueous ink composition ejected from nozzles of the recording head 2. For example, when the nozzles of the recording head 2 are ones that are driven by piezoelectric elements, the head unit 113 controls the operation of the piezoelectric element for each nozzle. The parameters controlled by the head unit 113 include the timing of the attachment of each droplet of and the dot size of the aqueous ink composition or treatment liquid. The carriage unit 112 and the head unit 113, moreover, together control the amount(s) of treatment liquid and/or aqueous ink composition attached per scan.

The drying unit 114 (DU) controls the temperature of heaters, such as the IR heater 3, preheater 7, platen heater 4, and heating heater 5.

The ink jet recording apparatus 1 alternates the operation of moving the carriage 9, with the recording head 2 thereon, in the main scanning direction and the transport operation (sub-scans). During each pass, the control section CONT controls the carriage unit 112 to make it move the recording head 2 in the main scanning direction, and also controls the head unit 113 to make the recording head 2 eject droplets of the treatment liquid and/or aqueous ink composition from predetermined nozzle holes and attach the droplets of the treatment liquid and/or aqueous ink composition to the recording medium M. During the transport operation, moreover, the control section CONT controls the transport unit 111 to make it transport the recording medium M in the direction of transport by a predetermined distance (feed).

As the ink jet recording apparatus 1 repeats a main scan (pass) and a sub-scan (transport), the recording zone is transported little by little with attached multiple droplets thereon. The droplets attached to the recording medium M are then dried using an afterheater 5, finishing the image. The finished recording may then be rolled by a rolling mechanism or transported on a flatbed mechanism.

The following describes the arrangement of lines of nozzles on the nozzle face of the recording head 2 of an ink jet recording apparatus used in the ink jet recording method according to this embodiment. In an exemplary arrangement, the recording head 2 has a first ejecting nozzle group, which includes a line of nozzles arranged in the sub-scanning direction and ejects a treatment liquid, and a second ejecting nozzle group, which includes a line of nozzles arranged in the sub-scanning direction and ejects an aqueous ink composition, and the first and second ejecting nozzle groups overlap when projected in the main scanning direction.

Figure 4:
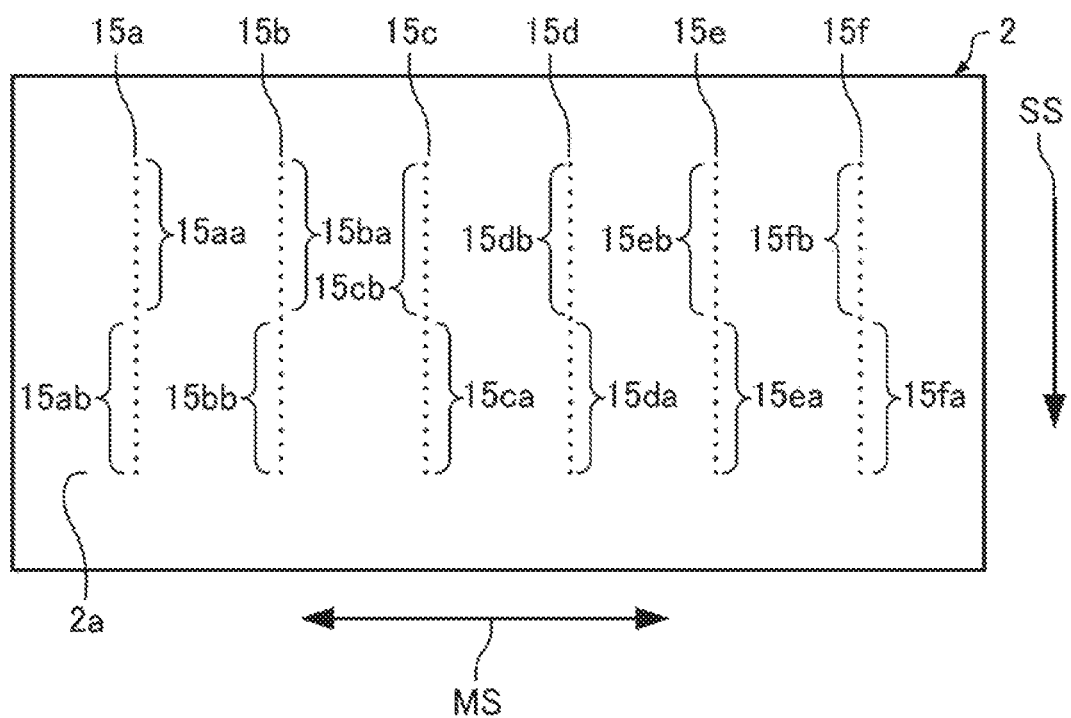
FIG. 4 is a schematic plan view of an example of a nozzle face of a recording head of an ink jet recording apparatus for use in an ink jet recording method according to an embodiment.

FIG. 4 schematically illustrates an example of an arrangement of nozzle lines on the nozzle face 2a of a recording head 2. The recording head 2 has a nozzle face 2a, a surface with multiple nozzles therein. In the example illustrated in FIG. 4, the nozzle face 2a of the recording head 2 has multiple nozzle lines 15a, 15b, 15c, 15d, 15e, and 15f each formed by multiple nozzles arranged in the sub-scanning direction SS. There may be more nozzle lines. In FIG. 4, MS denotes the main scanning direction.

When the ink jet recording method according to this embodiment is performed using a recording head 2 that has nozzle lines arranged as illustrated by way of example in FIG. 4, the recording head 2 can be used with, for example, the nozzle line 15a loaded with a treatment liquid and the nozzle lines 15b to 15f loaded with aqueous ink compositions in different colors. The number of nozzle lines and the order of the inks, for example, loaded are not critical and can be customized as appropriate.

In the illustrated example, the nozzle lines 15a to 15f are in the same position in the sub-scanning direction SS. The nozzle lines 15a to 15f only need to be partially in the same position in the sub-scanning direction SS. In other words, the nozzle lines 15a to 15f overlap when projected in the main scanning direction MS.

The recording head 2 can be controlled to use a subset of nozzles, in each nozzle line, in its recording job. That is, a selection can be made so that each nozzle line has a group of ejecting nozzles and a group of non-ejecting nozzles. In an exemplary configuration, such a selection can be made by the user by inputting his/her selection to the control section CONT. Alternatively, the ink jet recording apparatus 1 may have a stored preset menu, for example stored in the memory 103, from which the user can choose the assignment of ejecting and non-ejecting nozzles in each nozzle line. An assembly of nozzles used for recording in a nozzle line is hereinafter referred to as an ejecting nozzle group, and an assembly of nozzles not used for recording in a nozzle line is referred to as a non-ejecting nozzle group. An ejecting nozzle group is an assembly of those nozzles selected to be used for recording and assigned a duty to eject a liquid in a recording job and includes any such nozzle even if it goes wrong during the recording job due to an unintended problem. A non-ejecting nozzle group is an assembly of those nozzles not selected to be used for recording and not assigned a duty to eject a liquid during a recording job and includes any such nozzle even if it ejects a liquid for any purpose other than image formation, such as for maintenance purposes.

In the example in FIG. 4, a possible configuration is that in the treatment liquid nozzle line 15a, the nozzle subsets 15aa and 15ab are used for recording as ejecting nozzle groups. In the aqueous ink composition nozzle lines 15b to 15f, the nozzle subsets 15ba to 15fa (second ejecting nozzle groups) and the nozzle subsets 15bb to 15fb are used for recording as ejecting nozzle groups. This configuration allows the recording head 2 to fire the aqueous ink compositions and treatment liquid concurrently.

When two or more ejecting nozzle groups in different nozzle lines overlap when projected in the main scanning direction MS, the liquids ejected from the nozzle lines adhere to the same area of the recording medium in one main scan (pass). Such a form of attachment is referred to as concurrent firing.

The concurrent firing in this case not only refers to ejecting two or more liquids exactly at the same time but also encompasses ejecting two or more liquids onto the same recording area in one main scan. For example, a main scan may be an operation in which a recording head ejects a treatment liquid and an aqueous ink composition while moving in the main scanning direction.

Moreover, an ejecting nozzle group located upstream in the sub-scanning direction SS, or the direction of transport of the recording medium M, attaches the liquid it ejects to the recording medium M in advance of any ejecting nozzle group located downstream. For example, when there is an ejecting nozzle group upstream in the direction of transport of the recording medium, or in the sub-scanning direction, in the ink jet recording method according to this embodiment, this ejecting nozzle group attaches the ink, for example, it ejects to the recording medium M in advance of any ejecting nozzle group located downstream.

In the example illustrated in FIG. 4, an alternative configuration is that in the treatment liquid nozzle line 15a, the nozzle subset 15aa, upstream in the sub-scanning direction, is used for recording as an ejecting nozzle group, whereas the nozzle subset 15ab, downstream in the sub-scanning direction, is not used for recording and therefore is a non-ejecting nozzle group. In the aqueous ink composition nozzle lines 15b to 15f, the nozzle subsets 15ba and 15cb to 15fb are not used for recording and therefore are non-ejecting nozzle groups, whereas the nozzle subsets 15bb and 15ca to 15fa are used for recording as ejecting nozzle groups. This configuration allows the recording head 2 to fire the treatment liquid in advance of the aqueous ink compositions.

Since the ejecting nozzle group for the treatment liquid is upstream, in the sub-scanning direction SS, of those for the ink compositions, the treatment liquid adheres in an earlier main scan than the ink compositions to the same area of the recording medium M.

Although not illustrated, another configuration is possible in which the treatment liquid nozzle line 15a only has the nozzles 15aa, the ink composition nozzle lines 15b to 15f only have the nozzles 15bb and 15ca to 15fa, and these are all nozzles in the nozzle lines. In this case, the advance firing of the treatment liquid can be achieved without assigning a non-ejecting nozzle group in each nozzle line.

Any nozzle line can have an ejecting nozzle group in any position independently of the other nozzle lines, not limited to the example illustrated in FIG. 4. The overlap between nozzle lines when projected in the main scanning direction MS may be designed, for example to reduce the number of non-ejecting nozzle groups. The length and number of ejecting nozzle groups and those of non-ejecting nozzle groups in a nozzle line, moreover, can be customized as appropriate for each nozzle group.

When a first ejecting nozzle group, which ejects a treatment liquid, and a second ejecting nozzle group, which ejects an ink composition, overlap when projected in the main scanning direction, the first, or treatment liquid-, ejecting nozzle group only needs to partially overlap the second, or ink composition-, ejecting nozzle group. Preferably, the first, or treatment liquid-, ejecting nozzle group overlaps the second, or ink composition-, ejecting nozzle group over 50% or more, more preferably 70% or more, even more preferably 90% or more of its length in the sub-scanning direction. The same applies to the second, or ink composition-, ejecting nozzle group. This is preferred in that this helps reduce the overall length of the recording apparatus in the sub-scanning direction or increase the recording speed. With such an overlap, this embodiment is particularly advantageous in that it provides excellent ejection stability despite the increased recording speed.

Figure 5:
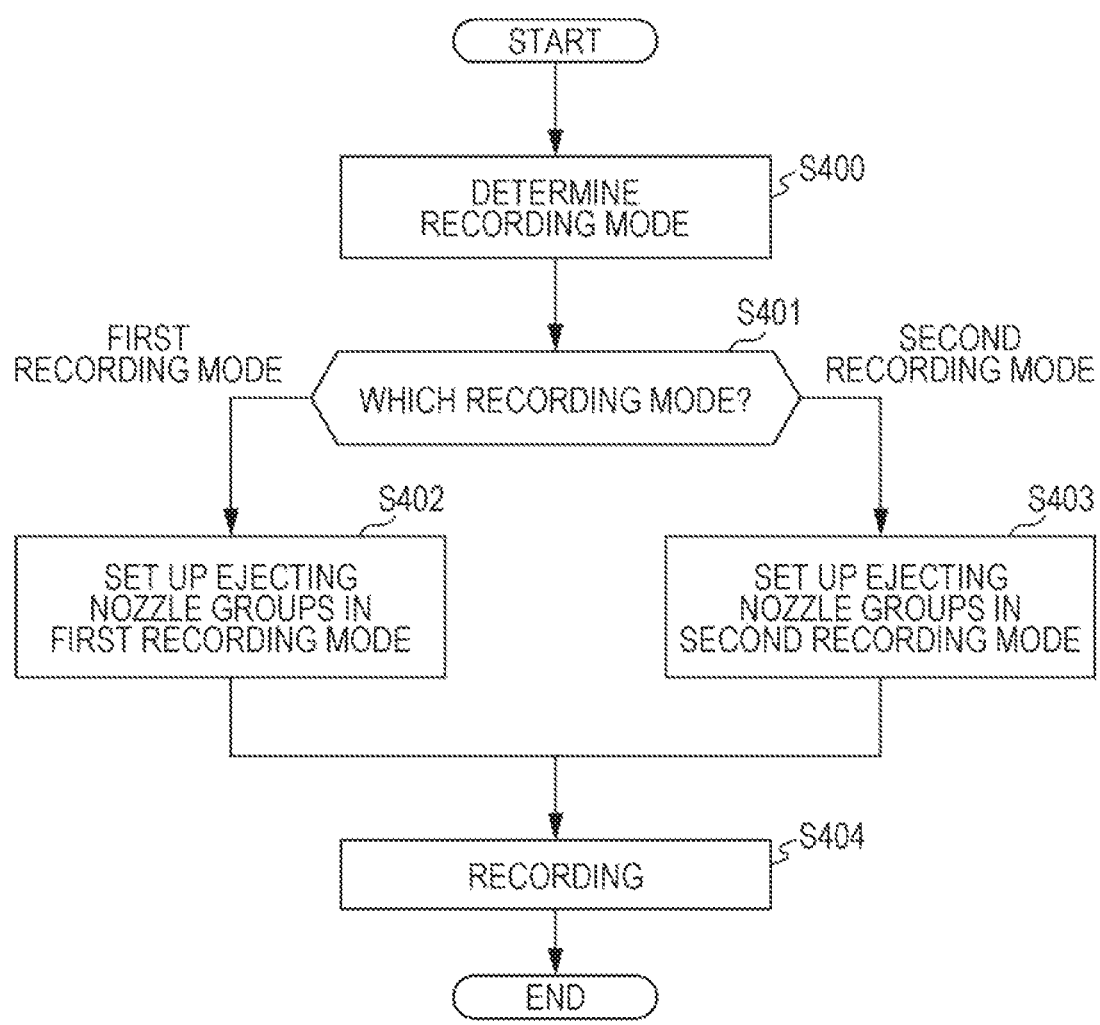
FIG. 5 is a flow chart illustrating an example of a recording process performed with an ink jet recording apparatus for use in an ink jet recording method according to an embodiment.

FIG. 5 is an example of a flow chart illustrating a process that an ink jet recording apparatus performs when producing a recording. To start a recording job, the control section of the ink jet recording apparatus determines the recording mode in step S400. The recording mode is a collection of detailed instructions for the recording job, including the assignment of ejecting and non-ejecting nozzle groups, ejection volumes, the style of liquid firing, and the motion of the recording head and the recording medium. The detailed instructions may further include, for example, the amount of attached treatment liquid.

The recording mode is determined based on an input signal sent from external equipment, such as a computer, to the ink jet recording apparatus, or is determined based on information the user inputs to a user input interface of the ink jet recording apparatus. The input signal from external equipment or the information input by the user may be a direct identification of the recording mode, or may be parameters related to recording, such as the type of recording medium on which the recording is to be produced, the desired recording speed, and the desired image quality. Other types of recording-related parameters can also be used. In the latter case, the ink jet recording apparatus stores inside, for example in its control section, preinstalled matching information as a set of rules that determine the relationship between the recording-related parameters and recording modes, and determines the recording mode with reference to the matching information. Alternatively, the recording mode may be determined using AI (artificial intelligence) technology.

In step S401, the determined recording mode is recognized. In step S402 or S403, the ejecting nozzle groups assigned to the determined recording mode are set up. Step S404 is the execution of recording. Although the number of recording modes in the drawing is two, the first and second recording modes, there may be three or more recording modes.

In this example, the recording apparatus offers different arrangements of ejecting nozzle groups according to recording mode. This advantageously allows the user to perform various types of recording.

1.4.2. Recording Head Having a Circulation Channel

The ink jet recording apparatus according to this embodiment includes a recording head that has at least a circulation channel for a treatment liquid. That is, at least a treatment liquid is circulated in a circulation channel. The recording head may have a circulation channel in which an aqueous ink composition is circulated.

In this embodiment, the recording head 2 has a circulation channel in which a treatment liquid is circulated. Even when the treatment liquid dries and becomes concentrated, the circulation channel for the treatment liquid allows the concentrated treatment liquid to be returned upstream and mixed with a fresh fraction there. This helps ensure good ejection stability.

Figure 6:
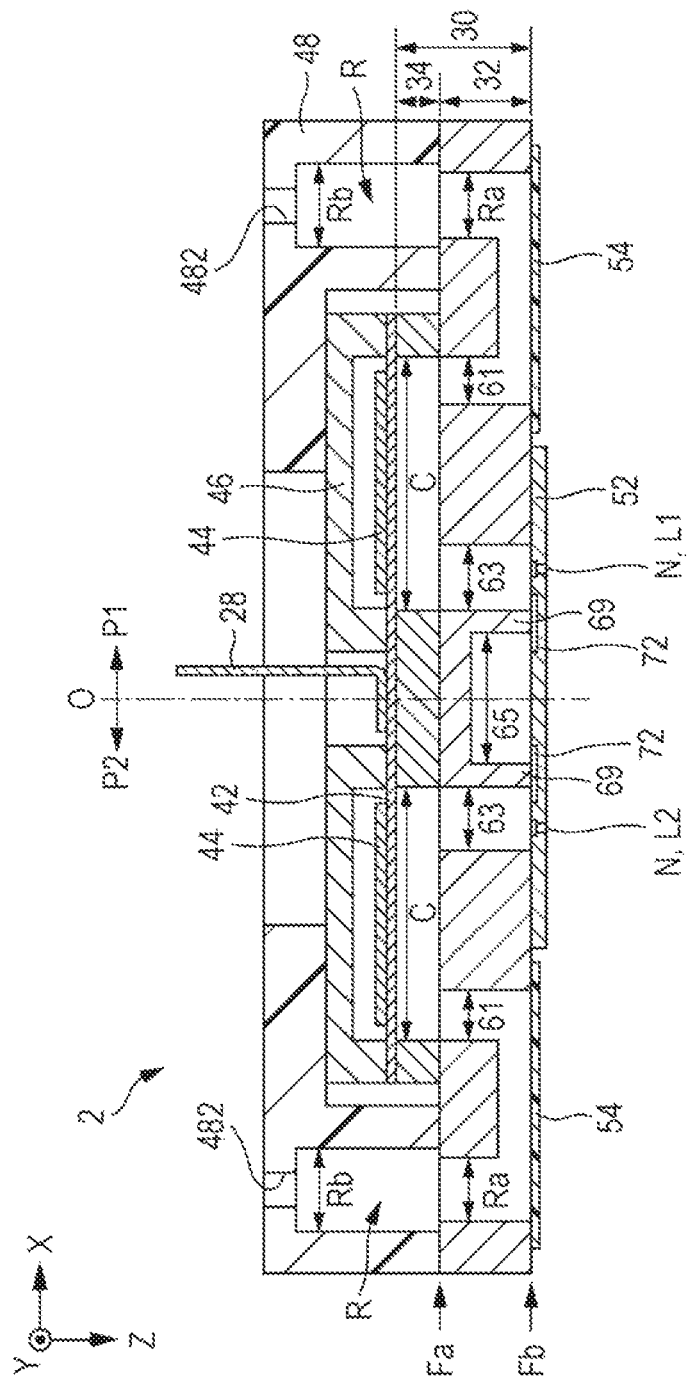
FIG. 6 is a schematic view of a cross-section of a recording head of an ink jet recording apparatus.
Figure 7:
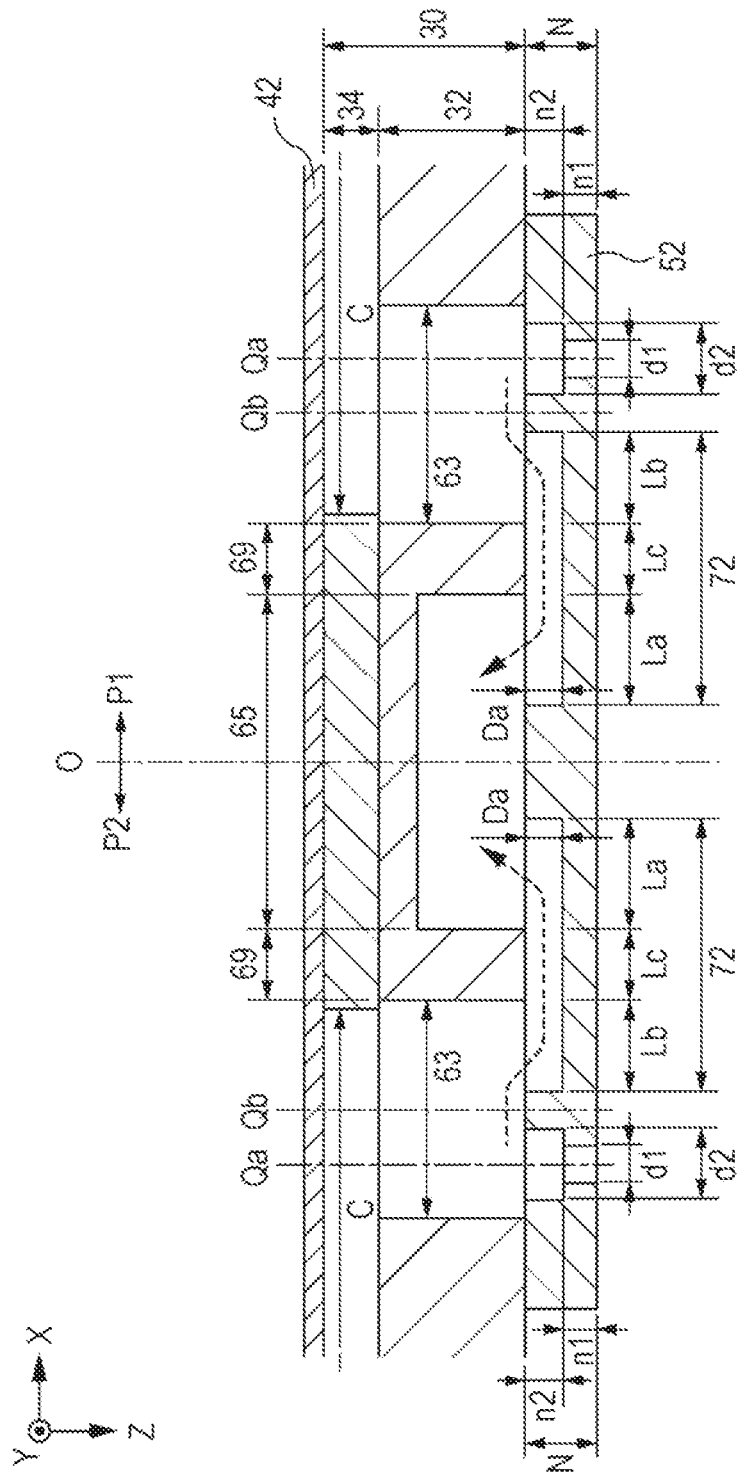
FIG. 7 is a schematic view of a cross-section of a circulation liquid chamber and its surroundings in the recording head.

FIG. 6 is a schematic view of a cross-section of a recording head 2 perpendicular to the direction of transport of the recording medium M (sub-scanning direction SS; see FIG. 2), in which the direction of transport of the recording medium M is the Y direction. FIG. 7 is a partial exploded perspective view of the recording head 2. In FIG. 6, a plane parallel to the surface of the recording medium M is an X-Y plane, and the direction perpendicular to an X-Y plane is hereinafter expressed as the Z direction. The direction in which the recording head 2 ejects a treatment liquid corresponds to the Z direction.

The multiple nozzles N of the recording head 2 are arranged in the Y direction to form nozzle lines. The plane that passes through the central axis of the recording head 2 parallel to the Y direction and is parallel to the Z direction, i.e., the Y-Z plane O, is hereinafter expressed as "the central plane."

As illustrated in FIG. 6, the recording head 2 has a structure in which the elements related to the nozzles N in the first line L1 and those related to the nozzles N in the second line L2 are plane-symmetric with respect to the central plane O. The structure of the recording head 2 is therefore substantially the same between the portion P1, which extends on the positive side in the X direction with respect to the central plane O (hereinafter also referred to as "the first portion"), and the portion P2, which extends on the negative side in the X direction (hereinafter also referred to as "the second portion"). The nozzles N in the first line L1 are in the first portion P1, and the nozzles N in the second line L2 are in the second portion P2. The central plane O corresponds to the interface between the first and second portions P1 and P2.

The nozzles N in the second and first lines L2 and L1 in FIG. 6 form the aforementioned treatment liquid nozzle line 15a (see FIG. 4). Although not described, the region of the recording head 2 from which aqueous ink compositions are ejected (the aforementioned aqueous ink composition nozzle lines 15b to 15f; see FIG. 4) may have a similar structure.

As illustrated in FIG. 6, the recording head 2 has a channel-forming portion 30. The channel-forming portion is a structural body that forms the channel for the treatment liquid to be supplied to the nozzles N. In this embodiment, the channel-forming portion 30 is a stack of a first channel substrate 32 and a second channel substrate 34. Each of the first and second channel substrates 32 and 34 is a plate-shaped element longer in the Y direction. The second channel substrate 34 has been attached to the surface on the negative side in the Z direction, or the surface Fa, of the first channel substrate 32, for example using an adhesive.

As illustrated in FIG. 6, the recording head 2 has a diaphragm 42, piezoelectric elements 44, a cover 46, and an enclosure 48 on the surface Fa of the first channel substrate 32 besides the second channel substrate 34. On the surface on the positive side in the Z direction, or the surface opposite the surface Fa (surface Fb), of the first channel substrate 32 is a nozzle plate 52 and a vibration absorber 54. Each element of the recording head 2 is generally plate-shaped and longer in the Y direction like the first and second channel substrates 32 and 34, and these elements have been joined together, for example using an adhesive. The Z direction can also be understood as the direction in which the first and second channel substrates 32 and 34 are stacked, the direction in which the first channel substrate 32 and the nozzle plate 52 are stacked, or the direction perpendicular to the surfaces of the plate-shaped elements.

The nozzle plate 52 is a plate-shaped element having multiple nozzles N and has been attached to the surface Fb of the first channel substrate 32, for example using an adhesive. Each of the nozzles N is a round through hole through which the treatment liquid is allowed to pass. The nozzle plate 52 in a first embodiment has multiple nozzles N forming a first line L1 and multiple nozzles N forming a second line L2. Specifically, a first line L1 of nozzles N extends along the Y direction in the region of the nozzle plate 52 on the positive side in the X direction with respect to the central plane O, and a second line L2 of nozzles N extends along the Y direction in the region on the negative side in the X direction. The nozzle plate 52 is a single plate-shaped element seamless between the portion having the first line L1 of nozzles N and that having the second line L2 of nozzles N. As for production, the nozzle plate 52 is produced by semiconductor fabrication technology. An example is to shape a silicon single-crystal substrate using techniques such as dry etching and wet etching, but any known material and process can be used to produce the nozzle plate 52.

As illustrated in FIG. 6, the first channel substrate 32 has a space Ra, multiple supply paths 61, and multiple communication paths 63 in each of the first and second portions P1 and P2. The space Ra is an elongated opening that extends in the Y direction in plan view, or when viewed in the Z direction. The supply paths 61 and communication paths 63 are through holes, with one supply path 61 and one communication path 63 for each nozzle N. The communication paths 63 are arranged in the Y direction in plan view, and the supply paths 61 are arranged in the Y direction between the sequence of the communication paths 63 and the space Ra. The multiple supply paths 61 communicate with a common space Ra. One communication path 63 overlaps the corresponding nozzle N in plan view. Specifically, one communication path 63 in the first portion P1 communicates with the one corresponding nozzle N in the first line L1. Likewise, one communication path 63 in the second portion P2 communicates with the one corresponding nozzle N in the second line L2.

As illustrated in FIG. 6, the second channel substrate 34 is a plate-shaped element having multiple pressure chambers C in each of the first and second portions P1 and P2. The pressure chambers C are arranged in the Y direction. Each pressure chamber C is an elongated space that extends in the X direction in plan view, with one pressure chamber C for each nozzle N. As with the nozzle plate 52, a possible way to produce the first and second channel substrates 32 and 34 is to shape a silicon single-crystal substrate by semiconductor fabrication technology, but any known material and process can be used to produce the first and second channel substrates 32 and 34. As described above by way of example, the channel-forming portion 30 and the nozzle plate 52 in the first embodiment include substrates made of silicon. These channel-forming portion 30 and nozzle plate 52 are therefore advantageous in that a very narrow channel can be created therein, for example by using semiconductor fabrication technology as described above by way of example.

As illustrated in FIG. 6, the recording head 2 has a diaphragm 42 on the surface of the second channel substrate 34 opposite the first channel substrate 32. The diaphragm 42 in the first embodiment is a plate-shaped element capable of elastic vibration. The second channel substrate 34 and the diaphragm 42 can alternatively be formed integrally by shaping a plate-shaped element having a predetermined thickness to remove part of its thickness selectively in the regions corresponding to the pressure chambers C.

As illustrated in FIG. 6, the surface Fa of the first channel substrate 32 and the diaphragm 42 face each other inside the pressure chambers C, spaced apart from each other. The pressure chambers C are spaces between the surface Fa of the first channel substrate 32 and the diaphragm 42 and causes a pressure change to the treatment liquid contained in the spaces. Each pressure chamber C is a space that is, for example, longer in the X direction, with one pressure chamber C for each nozzle N. Multiple pressure chambers C are arranged in the Y direction for each of the first and second lines L1 and L2.

As illustrated in FIG. 6, the end of one pressure chamber C closer to the central plane O overlaps a communication path 63 in plan view, and the end opposite the central plane O overlaps a supply path 61 in plan view. In each of the first and second portions P1 and P2, therefore, the pressure chambers C communicate with the nozzles N via the communication paths 63, and also communicate with the space Ra via the supply paths 61. The pressure chambers C may have a choke, or a constricted section, to place a predetermined resistance on the flow therein.

As illustrated in FIG. 6, the recording head 2 has multiple piezoelectric elements 44 on the surface of the diaphragm 42 opposite the pressure chambers C in each of the first and second portions P1 and P2, with the multiple piezoelectric elements 44 corresponding to different nozzles N. The piezoelectric elements 44 are elements that deform in response to supplied driving signals. The piezoelectric elements 44 are arranged in the Y direction to correspond to the pressure chambers C. One piezoelectric element 44 is, for example, a stack of two electrodes facing each other and a piezoelectric layer interposed therebetween. The piezoelectric elements 44 may alternatively be demarcated as their portion that deforms in response to supplied driving signals, or the active portion that vibrates the diaphragm 42. In this embodiment, the deformation of the piezoelectric elements 44 causes the diaphragm 42 to vibrate, and the vibrations change the pressure in the pressure chambers C. As a result, the treatment liquid contained in the pressure chambers C is ejected through the communication paths 63 and the nozzles N.

The cover 46 in FIG. 6 is a plate-shaped element for protecting the piezoelectric elements 44 and is on the surface of the diaphragm 42 or on the surface of the second channel substrate 34. Although the material and production process for the cover 46 are not critical, an example of a way to form the cover 46 is, as with the first and second channel substrates 32 and 34, to shape a silicon single-crystal substrate by semiconductor fabrication technology. Recesses in the surface of the cover 46 closer to the diaphragm 42 accommodate the multiple piezoelectric elements 44 arranged in the Y direction in the drawing.

The surface of the diaphragm 42 opposite the channel-forming portion 30 or the surface of the channel-forming portion 30 has been joined with an end of a circuit board 28. The circuit board 28 is a flexible mount component and has wiring (not illustrated) that electrically couples a control unit and the recording head 2. The end of the portion of the circuit board 28 that extends out through openings in the cover 46 and enclosure 48 is connected to the control unit. The flexible circuit board 28 is preferably a FPC (flexible printed circuit) or an FFC (flexible flat cable), for example.

The enclosure 48 is a casing for storing the treatment liquid to be supplied to the pressure chambers C and then to the nozzles N. The surface of the enclosure 48 on the positive side in the Z direction has been joined to the surface Fa of the first channel substrate 32, for example using an adhesive. Any known technology and process can be used to produce the enclosure 48. For example, the enclosure 48 can be produced by injection molding of a resin material.

As illustrated in FIG. 6, the enclosure 48 has a space Rb in each of the first and second portions P1 and P2. A space Rb in the enclosure 48 and a space Ra in the first channel substrate 32 communicate with each other. The spaces formed by the spaces Ra and the spaces Rb function as liquid reservoirs R that store the treatment liquid to be supplied to the pressure chambers C. The liquid reservoirs R are common liquid chambers, shared by the multiple nozzles N. There is a liquid reservoir R in each of the first and second portions P1 and P2. The liquid reservoir R in the first portion P1 is on the positive side in the X direction with respect to the central plane O, and the liquid reservoir R in the second portion P2 is on the negative side in the X direction with respect to the central plane O. The enclosure 48 also has, on the surface opposite the first channel substrate 32, inlets 482 for introducing the treatment liquid supplied from a liquid container into the liquid reservoirs R.

As illustrated in FIG. 6, the recording head 2 has a vibration absorber 54 on the surface Fb of the first channel substrate 32 in each of the first and second portions P1 and P2. The vibration absorbers 54 are flexible films that absorb changes in the pressure on the treatment liquid in the liquid reservoirs R, i.e., compliance substrates. In an exemplary configuration, the vibration absorbers 54 are placed on the surface Fb of the first channel substrate 32 to close the space Ra and supply paths in the first channel substrate 32, forming a wall, specifically the bottom, of the liquid reservoirs R.

As illustrated in FIG. 6, the first channel substrate 32 has a space 65 in the surface Fb, or its surface facing the nozzle plate 52 (hereinafter referred to as "the circulation liquid chamber"). The circulation liquid chamber 65 in the first embodiment is a bottomed elongated hole that extends in the Y direction in plan view. The nozzle plate 52, joined to the surface Fb of the first channel substrate 32, closes the opening of the circulation liquid chamber 65. In an exemplary configuration, the circulation liquid chamber 65 extends parallel to the first and second lines L1 and L2 of nozzles N and spans the multiple nozzles N. Specifically, there is a circulation liquid chamber 65 between the sequence of the multiple nozzles N in the first line L1 and that of the multiple nozzles N in the second line L2. The circulation liquid chamber 65 is therefore between the communication paths 63 in the first portion P1 and the communication paths 63 in the second portion P2. Overall, the channel-forming portion is a structural body that has pressure chambers C and communication paths 63 in a first portion P1, pressure chambers C and communication paths 63 in a second portion P2, and a circulation liquid chamber 65 between the communication paths 63 in the first portion P1 and the communication paths 63 in the second portion P2. As illustrated in FIG. 6, the channel-forming portion 30 includes wall-like portions 69 that divide the circulation liquid chamber 65 and each set of communication paths 63 (hereinafter referred to as "the partitions").

As mentioned above, multiple pressure chambers C and multiple piezoelectric elements 44 are arranged in the Y direction in each of the first and second portions P1 and P2. The circulation liquid chamber 65 therefore in other words extends in the Y direction to span the multiple pressure chambers C or piezoelectric elements 44 in each of the first and second portions P1 and P2. To paraphrase the configuration, a circulation liquid chamber 65 and liquid reservoirs R extend in the Y direction with spaces therebetween, and there are pressure chambers C, communication paths 63, and nozzles N in these spaces as illustrated in FIG. 6.

FIG. 7 is an enlarged cross-sectional view of the circulation liquid chamber 65 and its surroundings in the recording head 2. As illustrated in FIG. 7, one nozzle N in this embodiment includes a first section n1 and a second section n2. The first and second sections n1 and n2 are cylindrical spaces that are coaxial and communicate with each other. The second section n2 is closer than the first section n1 to the channel-forming portion 30. In this embodiment, the central axis Qa of each nozzle N is farther than the central axis Qb of a communication path 63 away from the circulation liquid chamber 65. The inner diameter d2 of the second section n2 is larger than the inner diameter d1 of the first section n1. With such a stairstep shape of each nozzle N, it is easier to achieve the desired flow resistance in each nozzle N. In this embodiment, the central axis Qa of each nozzle N is farther away from the circulation liquid chamber 65 than the central axis Qb of a communication path 63.

As illustrated in FIG. 7, the nozzle plate 52 has multiple drain paths 72 in its surface facing the channel-forming portion 30 in each of the first and second portions P1 and P2. The multiple drain paths 72 in the first portion P1 are in one-to-one correspondence with the multiple nozzles N in the first line L1 or the multiple communication paths 63 corresponding to the first line L1. The multiple drain paths 72 in the second portion P2 are in one-to-one correspondence with the multiple nozzles N in the second line L2 or the multiple communication paths 63 corresponding to the second line L2.

The combination of at least the supply paths 61 and the drain paths 72 is a circulation channel. By virtue of the circulation channel, the liquid supplied through the supply paths 61 to be ejected from the nozzles N can leave the route from the supply paths 61 to the nozzles N, rather than being ejected from the nozzles N, and rejoin the route from the supply paths 61 to the nozzles N.

Each drain path 72 is a groove, or elongated bottomed hole, extending in the X direction and functions as a channel through which the treatment liquid is allowed to pass. The drain paths 72 in the first embodiment are spaced apart from the nozzles N, specifically closer than the nozzles N corresponding to the drain paths 72 to the circulation liquid chamber 65. The multiple nozzles N, in particular their second section n2, and the multiple drain paths 72 are formed together, for example by semiconductor fabrication technology, such as shaping techniques including dry etching and wet etching.

As illustrated in FIG. 7, each drain path 72 is linear and has a width Wa substantially the same as the inner diameter d2 of the second section n2 of the nozzles N. The width, in the Y direction, of the drain paths 72 is smaller than the width, in the Y direction, of the pressure chambers C. The flow resistance in the drain paths 72 is therefore large compared with that in the configuration in which the width of the drain paths 72 is larger than that of the pressure chambers C. The configuration in which the width is larger than that of the pressure chambers C, however, is also acceptable. The depth Da of the drain paths 72 from the surface of the nozzle plate 52 is constant throughout the length. In the illustrated example, the depth of each drain path 72 is substantially the same as that of the second section n2 of the nozzles N. The configuration in which the drain paths 72 and the second section n2 have different depths is also acceptable, but in the equal-depth configuration, it is advantageously easier to form the drain paths 72 and the second section n2. The "depth" of a path represents the measurement of the path in the Z direction, such as the difference in height between the surface from which the path has been created and the bottom of the path.

One drain path 72 in the first portion P1 is closer than the nozzle N in the first line L1 corresponding to the drain path 72 to the circulation liquid chamber 65. One drain path 72 in the second portion P2 is closer than the nozzle N in the second line L2 corresponding to the drain path 72 to the circulation liquid chamber 65. The end of each drain path 72 farther away from the central plane O overlaps the one communication path 63 corresponding to the drain path 72 in plan view. That is, the drain paths 72 communicate with the communication paths 63. The end of each drain path 72 closer to the central plane O overlaps the circulation liquid chamber 65 in plan view. That is, the drain paths 72 communicate with the circulation liquid chamber 65. Overall, each of the multiple communication paths 63 communicates with the circulation liquid chamber 65 via a drain path 72. As indicated by broken-line arrows in FIG. 7, therefore, the treatment liquid in each communication path 63 is supplied to the circulation liquid chamber 65 via a drain path 72. In this embodiment, in other words, multiple communication paths 63 corresponding to the first line L1 of nozzles N and multiple communication paths 63 corresponding to the second line L2 of nozzles communicate with one common circulation liquid chamber 65.

FIG. 7 also illustrates the length La of the portion of one drain path 72 extending under the circulation liquid chamber 65, the length Lb, or measurement in the X direction, of the portion of the drain path 72 extending under a communication path 63, and the length Lc, or measurement in the X direction, of the portion of the drain path 72 extending under a partition 69 of the channel-forming portion 30. The length Lc corresponds to the thickness of the partition 69. The partition 69 functions as a choke in the drain path 72. This means the greater the length Lc, which corresponds to the thickness of the partition 69, is, the greater the flow resistance in the drain path 72 is. It is not critical which of the length La and the length Lc is longer, but in the illustrated example, the length La is greater than the length Lb, and the length La is also greater than the length Lc. In the illustrated example, moreover, the length Lb is greater than the length Lc. In this configuration, the treatment liquid is advantageously allowed to flow smoothly from the communication paths 63 into the circulation liquid chamber 65 via the drain paths 72, compared with the configuration in which the length La and/or length Lb is shorter than the length Lc.

In the recording head 2, overall, pressure chambers C communicate indirectly with a circulation liquid chamber 65, via communication paths 63 and drain paths 72. The communication between the pressure chambers C and the circulation liquid chamber 65 is therefore not direct. In this configuration, piezoelectric elements 44 operate to change the pressure in the pressure chambers C. As a result of the pressure change, part of the treatment liquid flowing in the communication paths 63 is ejected from nozzles N, and part of the rest flows out of the communication paths 63 into the circulation liquid chamber 65 via the drain paths 72. The inertances of the communication paths 63, nozzles N, and drain paths 72 are selected to ensure that during each vibration of the piezoelectric elements 44, more of the treatment liquid that flows in the communication paths 63 is ejected from the nozzles N than circulates, or than flows into the circulation liquid chamber 65 via the drain paths 72. In other words, the inertances are selected to ensure that when all piezoelectric elements 44 are driven together, the total circulation volume, or total volume flowing from the multiple communication paths 63 into the circulation liquid chamber 65, e.g., the volume of flow per unit time in the circulation liquid chamber 65, is greater than the total volume ejected from the multiple nozzles N.

Specifically, the flow resistance in the communication paths 63, that in the nozzles N, and that in the drain paths 72 are determined to ensure that the percentage of the circulation volume to the flow volume of the treatment liquid in the communication paths 63 is 70% or more, or the percentage of the ejection volume is 30% or less. In this configuration, the treatment liquid near the nozzles N can be effectively returned to the circulation liquid chamber 65 without affecting the volume of ejected treatment liquid. In general, stronger flow resistance in the drain paths 72 tends to result in reduced circulation and increased ejection, and weaker flow resistance in the drain paths 72 tends to result in increased circulation and reduced ejection.

In an exemplary configuration, the ink jet recording apparatus 1 includes a circulation mechanism (not illustrated). The circulation mechanism is for supplying the treatment liquid present in the circulation liquid chamber 65 to the liquid reservoirs R, or for circulating the treatment liquid. The circulation mechanism in an exemplary configuration includes a suction mechanism, such as a pump, that removes the treatment liquid from the circulation liquid chamber 65, a filter mechanism (not illustrated) that traps air bubbles and contaminants present in the treatment liquid, and a warming mechanism that dries/heats the treatment liquid to limit its thickening. The treatment liquid is supplied from the circulation mechanism to the liquid reservoirs R via the inlets 482, without air bubbles and contaminants therein and with only a limited extent of thickening by virtue of the circulation mechanism. As a result, the treatment liquid circulates by the route of the liquid reservoirs R→the supply paths 61→the pressure chambers C→the communication paths 63→the drain paths 72→the circulation liquid chamber 65→the circulation mechanism→the liquid reservoirs R.

Drain paths 72 created in the nozzle plate 52 to connect the communication paths 63 and the circulation liquid chamber 65 as in this configuration, moreover, allow the treatment liquid near the nozzles N to be returned to the circulation liquid chamber 65 efficiently. Furthermore, owing to the drain paths 72 corresponding to the first line L1 of nozzles N and the drain paths 72 corresponding to the second line L2 of nozzles N communicating with a common circulation liquid chamber 65, this configuration advantageously simplifies the structure, and therefore reduces the size, of the recording head 2 compared with the configuration in which the drain paths 72 corresponding to the first line L1 of nozzles N and the drain paths 72 corresponding to the second line L2 of nozzles N communicate with separate circulation liquid chambers.

The recording head 2 may have a configuration in which the drain paths 72 and the nozzles N are continuous, being spaced apart. A configuration is also acceptable in which besides the circulation liquid chamber 65, there are circulation liquid chambers corresponding respectively to the first and second portions P1 and P2.

The flow rate of the treatment liquid in the circulation channel, moreover, may be 0.1 times or more and 5.0 times or less, preferably 0.2 times or more and 4.0 times or less, more preferably 0.3 times or more and 3.0 times or less, even more preferably 0.5 times or more and 2.0 times or less the maximum rate of ejection of the treatment liquid from the recording head onto the recording medium. This ensures that a sufficient amount of treatment liquid adheres to the recording medium while being efficiently prevented from thickening by virtue of a good balance between the ejection and circulation volumes.

The maximum ejection rate of the treatment liquid is the rate of ejection of the treatment liquid from the recording head when the treatment liquid is ejected in droplets of the largest size that they can be per ejection for recording, at the highest ejection frequency for treatment liquid ejection for recording, and from all recording nozzles of the recording head.

The flow rate of the treatment liquid in the circulation channel is the total flow rate of the treatment liquid in the drain paths that are in the recording head for the treatment liquid and lead to nozzles of the recording head.

The maximum ejection rate and the flow rate in the circulation channel of a treatment liquid is expressed in the unit of mass/time, for example g/sec. The same applies to the ink composition.

The recording head 2, as mentioned above, includes pressure chambers C that apply pressure to a treatment liquid and make it ejected from nozzles, and the circulation channel may be configured so that the treatment liquid that has passed through the pressure chambers C circulates and returns to the pressure chambers C. In this case, the drain paths may be next to the pressure chambers or downstream of the pressure chambers. This advantageously provides superb ejection stability.

Alternatively, the circulation channel may have the drain paths at a particular position upstream of the pressure chambers in the recording head so that the treatment liquid is drained through the drain paths, circulates, and returns to the position. This also provides excellent ejection stability, because any contaminant in or thickening of the treatment liquid that reaches upstream of the pressure chambers is eliminated. An example of a position upstream of the pressure chambers is the liquid reservoirs R.

In the circulation channel, the treatment liquid that has passed through the drain paths may be circulated inside the recording head 2 and return to the treatment liquid route, or the circulation channel may be configured so that the treatment liquid that has passed through the drain paths is drained out of the recording head 2 once and then returns to the recording head 2. Of these, the former is preferred, for example in that it is easier to produce the circulation channel.

The use of such a recording head having a circulation channel helps limit a loss of reliability in the ejection of the treatment liquid even when the treatment liquid dries and becomes concentrated. It should be noted that the phenomenon of the concentration of a treatment liquid near nozzles, unlike the aggregation of ink, is extensive and even occurs far away from the nozzles (closer to the pressure chambers) compared with that of ink. The advantage of the circulation channel is therefore more significant than with the circulation of ink.

In the above example, the recording head 2 is a serial head. A serial head benefits significantly from the circulation channel for a treatment liquid according to this embodiment. Even when a mist produced at aqueous ink composition nozzles near the circulation channel flies and adheres to the treatment liquid nozzles, the circulating treatment liquid removes the aggregates of aqueous ink compositions near the end of the nozzles.

The recording apparatus in FIG. 2 is a serial recording apparatus, a type of recording apparatus that has a serial recording head and performs serial recording.

The recording head 2 may alternatively be a line head. Even with a line head, the circulation of a treatment liquid advantageously limits the loss of reliability in ejection caused by the drying and subsequent thickening of the treatment liquid.

Figure 8:
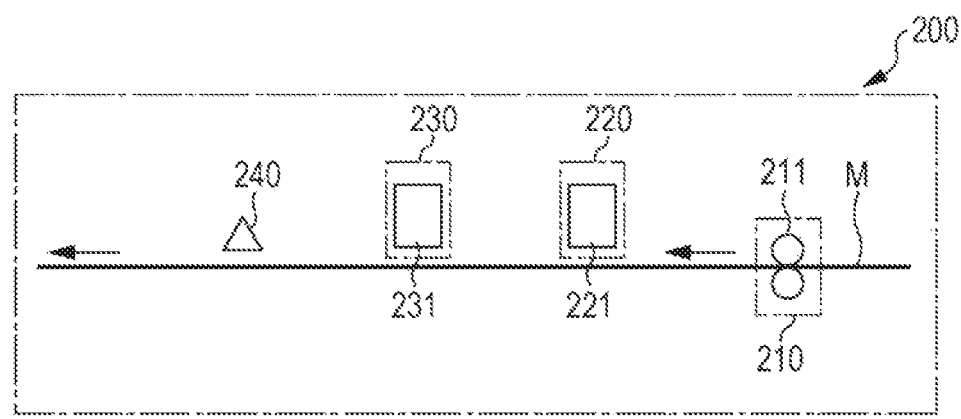
FIG. 8 is an outline cross-sectional diagram schematically illustrating part of a line recording apparatus.

FIG. 8 is an outline schematic cross-sectional diagram schematically illustrating part of a line recording apparatus, a type of recording apparatus that has a line head (line recording head) and performs line recording. The part 200 of the recording apparatus includes a treatment liquid applicator 220 that includes a recording head 221 for a treatment liquid, an ink composition applicator 230 that includes a recording head 231 for an ink composition, a recording medium transporter 210 that includes transport rollers 211 with which a recording medium M is transported, and a postheater 240 with which a postheating step, in which the recording medium M is post-heated, is performed. The recording heads 231 and 221 are line recording heads, a type of recording head having lines of nozzles extending in the direction of width of the recording medium M, or in the front-back direction in the drawing. The recording apparatus ejects a treatment liquid and an ink composition from the recording heads 231 and 221 and attaches them to the recording medium M while moving the relative positions of the recording heads 231 and 221 and the recording medium M by transporting the recording medium M in the direction of transport, the direction indicated by arrows in the drawing. This is referred to as a scan, and a scan is also referred to as a main scan or a pass. Line recording is a one-pass recording method, which produces a recording by attaching a treatment liquid and an ink composition onto a transported recording medium M in one pass using recording heads 231 and 221.

Except that it has a line recording head and performs line recording, a line recording apparatus can be the same as the serial recording apparatus 1 described above. A line recording apparatus may include a dryer with which a drying step is performed. For example, a line recording apparatus may include a dryer above the recording heads 231 and 221 in FIG. 8, the dryer being like the aeration fan 8 and IR heater 3 that are present above the recording head 2 in FIG. 1, and another below the recording heads 231 and 221 in FIG. 8, this one being like the platen heater 4 that is present below the recording head 2 in FIG. 1.

1.5. Other Steps

The ink jet recording method according to this embodiment includes attaching a treatment liquid and an aqueous ink composition to a recording medium. The method, however, may optionally further include attaching one or more of treatment liquids and aqueous ink compositions to the recording medium. Attachment of a liquid can be repeated as many times as appropriate, and the order is not critical either.

The ink jet recording method according this embodiment, furthermore, may include, for example, a drying step, in which liquid(s) attached to the recording medium is/are dried, or heating the recording medium (postheating step).

1.5.1. Drying Step

The ink jet recording method according to this embodiment may include a drying step. The ink jet recording method according to this embodiment may include drying the recording medium before or during a treatment liquid or aqueous ink composition attachment step. Besides stopping recording and leaving the recording medium to dry, the drying step can be performed by drying the recording medium using a drying mechanism. Examples of drying mechanisms include blowing air at the ordinary temperature or warm air toward the recording medium (aeration drying), irradiating the recording medium with heat radiation (e.g., infrared radiation) (radiation drying), a component that comes into contact with and transfers heat to the recording medium (conduction drying), and a combination of two or more of these. When the recording method includes a drying step, it is particularly preferred that the drying step be performed by aeration drying.

The surface temperature of the recording medium when a treatment liquid or aqueous ink composition is attached thereto is preferably 45° C. or less, more preferably 20° C. or more and 45° C. or less. Preferably, the surface temperature is 27.0° C. or more and 45° C. or less, more preferably 28° C. or more and 43° C. or less, even more preferably 30° C. or more and 40° C. or less, in particular 32° C. or more and 38° C. or less. This temperature is the surface temperature of the portion of the recording surface of the recording medium to which the treatment liquid or ink is attached in its attachment step, and is the highest temperature the recording zone reaches during the attachment step. A surface temperature in any of these ranges is preferred in terms of image quality, abrasion resistance, the reduction of clogging, and high gloss.

A drying step can be performed simultaneously with one or two or more of treatment liquid attachment steps and ink attachment steps as described above. When a drying step is performed simultaneously with an ink attachment step, the surface temperature of the recording medium is preferably 43° C. or less, more preferably 40° C. or less.

When a drying step, in which the recording medium is dried, is performed before or during a treatment liquid attachment step, the surface temperature of the recording medium when the treatment liquid adheres to the recording medium is preferably 30.0° C. or more, preferably 35.0° C. or more, more preferably 40.0° C. or more. This helps the treatment liquid form a coating, for example when the treatment liquid contains resin particles. This can therefore further improve the adhesion and abrasion resistance of the resulting image.

1.5.2. Postheating Step

The ink jet recording method according to this embodiment may further include, after attachment steps as described above, a postheating step, in which the recording medium is heated. The postheating step can be performed using, for example, an appropriate heater. For example, the postheating step is performed using an afterheater. (In the above example of an ink jet recording apparatus, the heating heater 5 corresponds to it.) The heater does not need to be a component of the ink jet recording apparatus but may be an external dryer. By ensuring that the resulting image dries to a fuller degree of fixation, this helps, for example, make the recording ready for use quickly.

The temperature of the recording medium in this case is not critical, but the Tg of the resin component that forms the resin particles in the recording, for example, may be a factor to consider. When the Tg of the resin component that forms the resin particles or a resin component that forms wax is considered, it is good to set the temperature of the recording medium higher than the Tg of the resin component that forms the resin particles by 5.0° C. or more, preferably 10.0° C. or more.

The surface temperature to which the recording medium is heated in the postheating step is 30.0° C. or more and 120.0° C. or less, preferably 40.0° C. or more and 100.0° C. or less, more preferably 50.0° C. or more and 95° C. or less, even more preferably 70° C. or more and 90° C. or less. It is particularly preferred that the recording medium be heated to a surface temperature of 80° C. or more in the postheating step. A temperature of the recording medium substantially in these ranges helps the resin particles and any wax in the recording form a coating and spread flat, and also helps the resulting image dry to a fuller degree of fixation.

Set of a Recording Head and a Treatment Liquid

This embodiment can be a set of a recording head and a treatment liquid. In a possible configuration, the set is a set of a recording head and a treatment liquid and includes a treatment liquid containing a flocculant and a recording head that ejects the treatment liquid. The recording head that ejects the treatment liquid has a circulation channel in which the treatment liquid is circulated, and is for use in an ink jet recording method in which an aqueous ink composition is ejected from a recording head and attached to a recording medium, and a treatment liquid is ejected from a recording head and attached to the recording medium. The treatment liquid, aqueous ink composition, recording heads, recording method, etc., can be as described above.

2. Examples and Comparative Examples

The following describes aspects of the present disclosure in detail by providing examples, but no aspect of the disclosure is limited to these Examples. In the following, "parts" and "%" are by mass unless stated otherwise.

2.1. Preparation of Treatment Liquids and an Aqueous Ink Composition

Treatment liquids R1 to R20 with different formulae and aqueous ink composition INK1 were prepared according to the formulae presented in Tables 1 and 2. Each composition was prepared by putting its ingredients, specified in Table 1 or 2, into a container, mixing the ingredients by stirring them for 2 hours with a magnetic stirrer, and then filtering the mixture through a 5-μm membrane filter to remove impurities, such as dust and coarse particles. The values in Tables 1 and 2 are all in % by mass, and the purified water was added to make the total mass of the composition 100%.

The pigment used to prepare the ink composition was beforehand mixed into water with a water-soluble styrene-acrylic resin as a dispersant (not listed in the tables) in a ratio by mass of 2:1 (pigment:dispersant). The resulting mixture was thoroughly stirred to give a liquid dispersion, and this liquid dispersion was used to prepare the ink.

TABLE 1

| Treatment liquid name | | R1 | R2 | R3 | R4 | R5 | R6 | R7 | R8 | R9 | R10 |
|---|---|---|---|---|---|---|---|---|---|---|---|
| Resin particles (anionic or nonionic resin) | Takelac W-635 | — | — | — | — | — | 2.0 | — | — | — | — |
| | Takelac W-6061 | — | — | — | — | — | — | 2.0 | — | — | — |
| | VINYBLAN 700 | — | — | — | — | — | — | — | 2.0 | — | — |
| | POLYSOL AT8860 | — | — | — | — | — | — | — | — | — | 2.0 |
| | Takelac W-6020 | — | — | — | 2.0 | — | — | — | — | — | — |
| Flocculant(s) Cationic resin | Catiomaster PDT-2 | 2.0 | — | 2.0 | — | — | — | — | — | — | — |
| | SF620 | — | 2.0 | — | — | — | — | — | — | 2.0 | — |
| Metal salt | Mg sulfate | — | — | 2.0 | 2.0 | 2.0 | 2.0 | 2.0 | 2.0 | 2.0 | 2.0 |
| Organic acid | Malonic acid | — | — | — | — | — | — | — | — | — | — |
| Solvents | 2-Pyrrolidone | 15.0 | 15.0 | 15.0 | 15.0 | 15.0 | 15.0 | 15.0 | 15.0 | 15.0 | 15.0 |
| | 3-Methoxy-N,N-dimethylpropanamide | — | — | — | — | — | — | — | — | — | — |
| | 1,2-Hexanediol | 5.0 | 5.0 | 5.0 | 5.0 | 5.0 | 5.0 | 5.0 | 5.0 | 5.0 | 5.0 |
| | 1,3-Butanediol | 5.0 | 5.0 | 5.0 | 5.0 | 5.0 | 5.0 | 5.0 | 5.0 | 5.0 | 5.0 |
| Surfactant | BYK348 | 2.0 | 2.0 | 2.0 | 2.0 | 2.0 | 2.0 | 2.0 | 2.0 | 2.0 | 2.0 |
| Colorant | P.B. 15:3 | — | — | — | — | — | — | — | — | — | — |
| Water | | Balance | Balance | Balance | Balance | Balance | Balance | Balance | Balance | Balance | Balance |
| Total | | 100 | 100 | 100 | 100 | 100 | 100 | 100 | 100 | 100 | 100 |
| Nitrogen-ontaining solvents/all solvents (% by mass) | | 60.0 | 60.0 | 60.0 | 60.0 | 60.0 | 60.0 | 60.0 | 60.0 | 60.0 | 60.0 |

TABLE 2

| Treatment liquid or aqueous ink composition name | | R11 | R12 | R13 | R14 | R15 | R16 | R17 | R18 | R19 | R20 | INK1 |
|---|---|---|---|---|---|---|---|---|---|---|---|---|
| Resin particles (anionic or nonionic resin) | Takelac W-635 | — | 2.0 | — | — | — | — | — | — | — | — | — |
| | Takelac W-6061 | — | — | 2.0 | — | — | — | — | — | — | 2.0 | — |
| | VINYBLAN 700 | — | — | — | 2.0 | — | — | — | — | — | — | — |
| | POLYSOL AT8860 | — | — | — | — | 2.0 | — | — | — | — | — | 4.0 |
| | Takelac W-6020 | 2.0 | — | — | — | — | — | — | — | — | — | — |
| Flocculant(s) Cationic resin | Catiomaster PDT-2 | — | — | — | — | — | — | 2.0 | — | — | — | — |
| | SF620 | — | — | — | — | — | — | — | 2.0 | 2.0 | — | — |
| Metal salt | Mg sulfate | — | — | — | — | — | — | — | — | — | 2.0 | — |
| Organic acid | Malonic acid | — | — | — | — | — | 2.0 | — | — | — | — | — |

TABLE 2-continued

| Treatment liquid or aqueous ink composition name | | R11 | R12 | R13 | R14 | R15 | R16 | R17 | R18 | R19 | R20 | INK1 |
|---|---|---|---|---|---|---|---|---|---|---|---|---|
| Solvents | 2-Pyrrolidone | 15.0 | 15.0 | 15.0 | 15.0 | 15.0 | 15.0 | 15.0 | 7.0 | 15.0 | 15.0 | 15.0 |
| | 3-Methoxy-N,N-dimethyl-propanamide | — | — | — | — | — | — | — | 8.0 | — | — | — |
| | 1,2-Hexanediol | 5.0 | 5.0 | 5.0 | 5.0 | 5.0 | 5.0 | 5.0 | 5.0 | 5.0 | 5.0 | 5.0 |
| | 1,3-Butanediol | 5.0 | 5.0 | 5.0 | 5.0 | 5.0 | 5.0 | 5.0 | 5.0 | 5.0 | 5.0 | 5.0 |
| Surfactant | BYK348 | 2.0 | 2.0 | 2.0 | 2.0 | 2.0 | 2.0 | 2.0 | 2.0 | 2.0 | 2.0 | 2.0 |
| Colorant | P.B. 15:3 | — | — | — | — | — | — | — | — | — | — | — |
| | Water | Balance | Balance | Balance | Balance | Balance | Balance | Balance | Balance | Balance | Balance | Balance |
| | Total | 100 | 100 | 100 | 100 | 100 | 100 | 100 | 100 | 100 | 100 | 100 |
| Nitrogen-ontaining solvents/all solvents (% by mass) | | 60.0 | 60.0 | 60.0 | 60.0 | 60.0 | 60.0 | 60.0 | 60.0 | 60.0 | 60.0 | 60.0 |

Major ingredients in Tables 1 and 2 were as follows.
Resin Particles:
Takelac W-635: A nonionic urethane resin, particles, Tg=70.0° C. (Mitsui Chemicals Polyurethanes)
Takelac W-6061: An anionic urethane resin, particles, Tg=25.0° C. (Mitsui Chemicals Polyurethanes)
VINYBLAN 700: An anionic vinyl chloride resin, particles, Tg=70.0° C. (Nissin Chemical Industry)
POLYSOL AT860: An anionic acrylic resin, particles, Tg=60.0° C. (Showa Denko)
Takelac W-6020: An anionic urethane resin, particles, Tg=90.0° C. (Mitsui Chemicals Polyurethanes)
Flocculants:
Catiomaster PDT-2: A cationic amine resin, water-soluble, Tg=70.0° C. (Yokkaichi Chemical)
SF620: A cationic urethane resin, particles, Tg=45.0° C. (DKS)
Mg sulfate: Magnesium sulfate heptahydrate (The percentages in the tables exclude the water of hydration.)
Other ingredients:
BYK348: Silicone surfactant "BYK348," BYK
P.B. 15:3: C.I. Pigment Blue 15:3
2.2. Testing
2.2.1. Recording Test
As a line printer, a modified Seiko Epson Corporation L-4533A was used. Two recording heads, one being for a treatment liquid and placed upstream in the direction of recording medium transport and the other being for an ink composition and placed downstream, were fixed not to move during recording, making the printer a line recording apparatus (line printer).

As serial printers, modified Seiko Epson Corporation SC-540650 printers were used. In Tables 3 to 5, the recording apparatus row is "Apparatus 1" if it was the line printer, "Apparatus 2" if it was a serial printer of the undermentioned style 1 (concurrent firing), or "Apparatus 3" if it was a serial printer of the undermentioned style 2 (advance firing).

All recording apparatuses had an aeration fan and an IR heater above the recording heads and a platen heater below the recording heads like the illustration in FIG. 1.

Each recording head had a circulation channel that was as illustrated in FIGS. 6 and 7. In Tables 3 and 5, the "Circulation channel" row is "Yes" if the treatment liquid was circulated in the circulation channel, or "No" if the treatment liquid was not circulated in the circulation channel.

The circulation volume of the treatment liquid was as in Tables 3 and 5, in which the circulation volume is expressed as a multiplying factor, the flow rate of the treatment liquid from the recording head to the circulation channel (mass/time) divided by the aforementioned maximum rate of ejection of the treatment liquid from the head (mass/time). A factor of 1 means that the ejection rate and the rate of flow into the circulation channel are equal.

The circulation volume of the aqueous ink composition was constant, a factor of 0.6, throughout. With this 0.6-fold circulation volume, the aqueous ink composition was good in continuous ejection and deviation even in Example 20, in which the circulation volume of the treatment liquid was a factor of 0.6. These assessments were made as described hereinafter.

The serial printers were configured to produce a recording by performing multiple main scans, in which the recording heads move in a main scanning direction, and multiple sub-scans, in which the recording medium moves in a sub-scanning direction. The recording heads were configured as illustrated in FIG. 4; they had a line of treatment liquid nozzles arranged in the sub-scanning direction (nozzle line 15a) as a first nozzle line and a line of aqueous ink composition nozzles arranged in the sub-scanning direction (nozzle line 15b) as a second nozzle line, and the first nozzle line overlapped the second nozzle line when projected in the main scanning direction.

The style of recording was selected from the following two.

Style 1: Concurrent firing: The entire first nozzle line was used for recording as a treatment liquid-ejecting nozzle group, and the entire second nozzle line was used for recording as an ink composition-ejecting nozzle group. In this recording style, a treatment liquid and an aqueous ink composition are ejected together while the recording heads are scanning (both the treatment liquid and aqueous ink composition adhere in one pass), and all nozzles in the treatment liquid nozzle line and in the aqueous ink composition nozzle line are assigned to the ejecting nozzle group.

Style 2: Advance firing: The nozzle subset 15aa, in the first nozzle line, was used for recording as a treatment liquid-ejecting nozzle group, and the nozzle subset 15bb, in the second nozzle line, was used for recording as an ink composition-ejecting nozzle group. In this recording style, a treatment liquid recording head scans to attach a treatment liquid first, and then, in a later scan, an aqueous ink composition is attached to the area to which the treatment liquid has been attached. Substantially half of the nozzles in the treatment liquid nozzle line and in the aqueous ink composition nozzle line are assigned to the ejecting nozzle group, and the ejecting nozzle groups in the two lines do not overlap when projected in the main scanning direction.

In each nozzle line, the spacing between adjacent nozzles parallel to the line was 360 dpi, and the number of nozzles was 360. A 5×5 cm pattern was recorded, with the ejection of the aqueous ink composition customized so that its amount in the resulting pattern would be 15.0 mg/inch². The treatment liquid was applied to cover the aqueous ink composition, with its amount as in the tables. In the examples in which the line printer was used, one-pass recording was performed.

In the examples in which the style-1 serial printer was used, four-pass recording was performed. That is, the length of one sub-scan was set to approximately ¼ of the length of the ejecting nozzle groups in the sub-scanning direction so that the liquids would be attached to a given region of the recording medium in four passes.

When the advance-firing (style 2) serial printer was used, the treatment liquid was applied in four passes, and then the ink composition was applied in four passes.

The recording medium was a sheet of polyvinyl chloride (Sumitomo 3M Ltd., "IJ-40"). The platen heater was turned on to heat the recording medium. The surface temperature of the recording medium was measured in each example, and the measured temperatures are presented in Tables 3 to 5 as "Primary heating temperature."

The temperature during the attachment steps is presented in Tables 3 to 5. Aeration and conduction dryers were used in the attachment steps, and "Y" in the tables means that that type of dryer was used in that example. The velocity of air blow from the aeration drier was 2 m/s on the recording medium. The conduction dryer was the platen heater. The aeration dryer was the aeration fan, which was operated to blow air at the ordinary temperature (25° C.) to the recording medium.

2.2.2. Continuous Ejection (Ejection Stability)

First, the surface of the nozzle face was dubbed with a cloth a few times to make substantially half of the nozzles in the nozzle line unable to eject the treatment liquid. With these nozzles in that disabled state, recording was simulated under the same conditions as in the above recording test continuously for 2 hours without suction cleaning. After the simulation, the disabled nozzles were subjected to the following ejection stability test. Continuous ejection was graded according to the criteria below. The results are presented in Tables 3 to 5. In all examples, an attempt of suction cleaning performed immediately after substantially half of the nozzles in the nozzle line were made unable to eject the treatment liquid restored all nozzles. In some examples, the disabled nozzles remained so even with the suction cleaning after the simulation, and the pressure chambers leading to such nozzles contained sticky contaminants.

A: One attempt of suction cleaning rendered all nozzles capable of ejection.
B: Two attempts of suction cleaning rendered all nozzles capable of ejection.
C: Three attempts of suction cleaning rendered all nozzles capable of ejection.
D: Even after three attempts of suction cleaning, not all nozzles were capable of ejection.

2.2.3. Deviation (Ejection Stability)

The recording test was performed continuously for 2 hours. After the completion of recording, the recordings were inspected for displacement from the intended impact points for the treatment liquid nozzles. The percentage of nozzles for which the displacement was ½ or more of the nozzle spacing was determined, and deviation was graded according to the criteria below. The results are presented in Tables 3 to 5. The nozzles that caused deviation contained contaminants or had contaminants around the openings.

A: 2% or less
B: More than 2% but not more than 4%
C: More than 4% but not more than 6%
D: More than 6%

2.2.4. Image Quality

The pattern on a recording produced as described above was visually inspected, and image quality was graded according to the criteria below. The results are presented in Tables 3 to 5.

A: The inside of the pattern was even in density, and there was no ink bleed along the edges of the pattern.
B: The inside of the pattern was even in density, but there was some ink bleed along the edges of the pattern.
C: The inside of the pattern was noticeably uneven in density.

2.2.5. Abrasion Resistance

The patterned area of a recording produced as described above was subjected to 60 to-and-fro strokes of rubbing under a load of 330 g with a friction finger of AB-301 Color Fastness Rubbing Tester (a trade name of a Tester Sangyo product) fitted with a piece of cotton fabric (as defined in JIS L 0803). The patterned area of the recording medium was visually inspected for peeling, and abrasion resistance was graded according to the criteria below. The results are presented in Tables 3 to 5.

A: There was no flaw in or peeling of the pattern, and no ink transferred to the cotton fabric.
B: There was no noticeable flaw in or peeling of the pattern, but some ink transferred to the cotton fabric.
C: There were some noticeable flaws in or some extent of noticeable peeling of the pattern.
D: There were a considerable number of noticeable flaws in or a considerable extent of noticeable peeling of the pattern.

TABLE 3

| | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| Treatment liquid name | R1 | R2 | R3 | R16 | R4 | R5 | R6 | R7 | R8 | R9 | R10 | R17 | R18 | R19 |
| Amount of treatment liquid (relative to ink (% by mass)) | 10 | 10 | 10 | 10 | 10 | 10 | 10 | 10 | 10 | 10 | 10 | 10 | 10 | 10 |
| Circulation channel | Yes | Yes | Yes | Yes | Yes | Yes | Yes | Yes | Yes | Yes | Yes | Yes | Yes | Yes |
| Recording apparatus | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 |
| Drying mechanism Conduction | Y | Y | Y | Y | Y | Y | Y | Y | Y | Y | Y | Y | Y | Y |
| Drying mechanism Aeration | Y | Y | Y | Y | Y | Y | Y | Y | Y | Y | Y | Y | Y | Y |
| Primary heating temperature (° C.) | 35.0 | 35.0 | 35.0 | 35.0 | 35.0 | 35.0 | 35.0 | 35.0 | 35.0 | 35.0 | 35.0 | 35.0 | 35.0 | 35.0 |
| Circulation volume (relative to maximum ejection volume (factor)) | 1.2 | 1.2 | 1.2 | 1.2 | 1.2 | 1.2 | 1.2 | 1.2 | 1.2 | 1.2 | 1.2 | 1.2 | 1.2 | 1.2 |
| Ejection stability Continuous ejection | A | A | A | A | A | A | A | B | B | A | A | B | B | B |
| Ejection stability Deviation | A | A | A | A | A | A | A | B | A | A | B | A | A | A |
| Image quality | A | B | A | B | A | A | A | A | A | A | A | A | B | B |
| Abrasion resistance | A | B | C | C | A | A | A | B | A | B | B | A | A | A |

TABLE 4

| | Example 15 | Example 16 | Example 17 | Example 18 | Example 19 | Example 20 | Example 21 | Example 22 | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|---|---|---|---|---|---|---|---|
| Treatment liquid name | R20 | R7 | R7 | R3 | R1 | R1 | R1 | R1 | R11 | R12 | R13 | R14 | R15 | R11 | R12 | R13 |
| Amount of treatment liquid (relative to ink (% by mass)) | 10 | 10 | 20 | 5 | 10 | 10 | 10 | 10 | 10 | 10 | 10 | 10 | 10 | 10 | 10 | 10 |
| Circulation channel | Yes | Yes | Yes | Yes | Yes | Yes | Yes | Yes | Yes | Yes | Yes | Yes | Yes | Yes | No | No |
| Recording apparatus | Apparatus 1 | Apparatus 1 | Apparatus 1 | Apparatus 1 | Apparatus 1 | Apparatus 1 | Apparatus 2 | Apparatus 3 | Apparatus 1 | Apparatus 1 | Apparatus 1 | Apparatus 1 | Apparatus 1 | Apparatus 1 | Apparatus 1 | Apparatus 1 |
| Drying mechanism: Conduction | Y | Y | Y | Y | Y | Y | Y | Y | Y | Y | Y | Y | Y | Y | Y | Y |
| Drying mechanism: Aeration | Y | Y | Y | Y | Y | Y | Y | Y | Y | Y | Y | Y | Y | Y | Y | Y |
| Primary heating temperature (°C) | 35.0 | 35.0 | 35.0 | 35.0 | 40.0 | 35.0 | 35.0 | 35.0 | 35.0 | 35.0 | 35.0 | 35.0 | 35.0 | 35.0 | 35.0 | 35.0 |
| Circulation volume (relative to maximum ejection volume (factor)) | 1.2 | 1.2 | 1.2 | 1.2 | 1.2 | 0.6 | 1.2 | 1.2 | 1.2 | 1.2 | 1.2 | 1.2 | 1.2 | 1.2 | 1.2 | 1.2 |
| Ejection stability: Continuous ejection | A | A | A | A | B | B | A | A | A | A | A | B | A | C | C | C |
| Ejection stability: Deviation | A | A | A | A | B | B | B | A | A | A | A | A | A | A | A | A |
| Image quality | A | B | A | B | B | A | B | A | C | C | C | C | C | C | C | C |
| Abrasion resistance | C | B | C | B | A | A | A | A | A | A | A | A | A | A | A | A |

TABLE 5

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Treatment liquid name | | R1 | R2 | R3 | R4 | R5 | R6 | R7 | R1 | R1 |
| Amount of treatment liquid (relative to ink (% by mass)) | | 10 | 10 | 20 | 5 | 10 | 10 | 10 | 10 | 10 |
| Circulation channel | | No | No | No | No | No | No | No | No | No |
| Recording apparatus | | Apparatus 1 | Apparatus 1 | Apparatus 1 | Apparatus 1 | Apparatus 1 | Apparatus 1 | Apparatus 1 | Apparatus 3 | Apparatus 2 |
| Drying mechanism | Conduction | Y | Y | Y | Y | Y | Y | Y | Y | Y |
| | Aeration | Y | Y | Y | Y | Y | Y | Y | Y | Y |
| Primary heating temperature (° C.) | | 35.0 | 35.0 | 35.0 | 35.0 | 40.0 | 35.0 | 35.0 | 35.0 | 35.0 |
| Circulation volume (relative to maximum ejection volume (factor)) | | 1.2 | 1.2 | 1.2 | 1.2 | 1.2 | 0.6 | 1.2 | 1.2 | 1.2 |
| Ejection stability | Continuous ejection | C | C | B | C | D | C | D | C | D |
| | Deviation | C | C | C | C | D | C | D | C | C |
| Image quality | | A | B | A | A | A | A | A | A | B |
| Abrasion resistance | | A | B | C | A | A | A | B | A | A |

2.3. Test Results

The Examples, in which recordings were produced with a treatment liquid containing flocculants circulated using a head circulation mechanism, were all superior in ejection stability. By contrast, the Comparative Examples, in which the treatment liquid was not circulated using a head circulation mechanism, were all inferior in ejection stability. The following discusses this in detail.

From Examples 3 and 4 compared with the other Examples, it was found that abrasion resistance is better when the treatment liquid contains a resin.

From Examples 2 to 10, abrasion resistance was somewhat worse with cationic resin particles than with other types of resins.

From comparing Examples 6 and 11, abrasion resistance was superb with particles of a urethane resin.

From comparing Examples 6 and 8, abrasion resistance and ejection stability were better with not too low a glass transition temperature of the resin particles.

For Example 15, it was found that abrasion resistance is somewhat inferior when the percentage of nitrogen-containing solvents is low.

From comparing Examples 13 and 2, abrasion resistance was better with an acyclic amide as a nitrogen-containing solvent.

Example 16 indicates that omitting aeration drying leaves ejection stability good, but affects image quality.

Example 20 indicates that ejection stability slightly decreases when the circulation volume of the treatment liquid is small. Changing the circulation volume of the treatment liquid had greater impact on grades than changing that of the aqueous ink composition.

From comparison between Examples 17 and 8 and between Examples 18 and 3, image quality was better with a greater amount of attached treatment liquid, and ejection stability and abrasion resistance were better with a smaller amount of attached treatment liquid.

From Comparative Example 3, ejection stability was somewhat better with no resin in the treatment liquid than with a resin in the treatment liquid when the treatment liquid was not circulated.

From Comparative Examples 1, 2, and 4 to 7, when the treatment liquid was not circulated, ejection stability was slightly better with no resin particles in the treatment liquid or with cationic or nonionic resin particles in the treatment liquid than with anionic resin particles in the treatment liquid.

From comparing Comparative Examples 8 and 9, when the treatment liquid was not circulated, ejection stability was worse with concurrent firing of the treatment liquid.

When a look is taken at Reference Examples, image quality was inferior when the treatment liquid contained no flocculant. Ejection stability was better than in the Comparative Examples, even when the treatment liquid was not circulated using a head circulation mechanism.

The present disclosure is not limited to the above embodiments, and many variations are possible. For example, the present disclosure embraces configurations substantially identical to those described in the embodiments (e.g., configurations identical in function, methodology, and results to or having the same goal and offering the same advantages as the described ones). The present disclosure also includes configurations created by changing any nonessential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink jet recording method comprising:
an ink attachment step including ejecting an aqueous ink composition from a recording head to attach the aqueous ink composition to a recording medium; and a treatment liquid attachment step including ejecting a treatment liquid containing a flocculant from a recording head to attach the treatment liquid to the recording medium, wherein the recording head for ejecting the treatment liquid has a circulation channel configured to circulate the treatment liquid; and wherein the treatment liquid contains a cationic polymer as the flocculant and resin particles.

2. An ink jet recording method comprising:

an ink attachment step including ejecting an aqueous ink composition from a recording head to attach the aqueous ink composition to a recording medium; and a treatment liquid attachment step including ejecting a treatment liquid containing a flocculant and at least one type of resin particles from a recording head to attach the treatment liquid to the recording medium, wherein the recording head for ejecting the treatment liquid has a circulation channel configured to circulate the treatment liquid, and a glass transition temperature of the resin particles is 40.0° C. or more.

3. The ink jet recording method according to claim 2, wherein
the treatment liquid contains a resin.

4. The ink jet recording method according to claim wherein
the treatment liquid contains a resin, and the resin is a cationic polymer as the flocculant.

5. The ink jet recording method according to claim 2, wherein
the resin particles are one or two or more of anionic resins and nonionic resins.

6. The ink jet recording method according to claim 2, wherein
the resin particles are one or two or more of urethane resins and acrylic resins.

7. The ink jet recording method according to claim 2, further comprising
a drying step including drying, using at least one drying mechanism, the treatment liquid attached to the recording medium in the treatment liquid attachment step.

8. The ink jet recording method according to claim 7, wherein
the drying mechanism is one or two or more of conduction, aeration, and radiation drying mechanisms.

9. The ink jet recording method according to claim 2, wherein
a surface temperature of the recording medium in the treatment liquid attachment step is 30.0° C. or more.

10. The ink jet recording method according to claim wherein
the recording medium is a low-absorbent recording medium or non-absorbent recording medium.

11. The ink jet recording method according to claim 2, wherein
a flow rate of the treatment liquid in the circulation channel is 0.1 times or more and 5.0 times or less a maximum rate of ejection of the treatment liquid from the recording head onto the recording medium.

12. The ink jet recording method according to claim 2, wherein:
the recording head used in the treatment liquid attachment step has a pressure chamber configured to apply pressure to the treatment liquid to eject the treatment liquid from a nozzle; and
after the treatment liquid passes through the pressure chamber, the circulation channel supplies the treatment liquid back to the pressure chamber.

13. The ink jet recording method according to claim 2, wherein
in the treatment liquid attachment step, the circulation channel drains the treatment liquid out of the recording head and then supplies the treatment liquid back to the recording head.

14. The ink jet recording method according to claim 2, wherein
the recording heads are line heads.

15. The ink jet recording method according to claim 2, wherein
the recording heads are serial heads.

16. The ink jet recording method according to claim 15, wherein:
the treatment liquid attachment step and the ink attachment step are performed through a plurality of main scans and a plurality of sub-scans, a main scan being a movement of the recording heads in a main scanning direction, and a sub-scan being a movement of the recording medium in a sub-scanning direction as a direction crossing the main scanning direction;
the recording heads have:
a first ejecting nozzle group as a line of nozzles arranged in the sub-scanning direction and configured to eject the treatment liquid; and
a second ejecting nozzle group as a line of nozzles arranged in the sub-scanning direction and configured to eject the aqueous ink composition; and
the first ejecting nozzle group overlaps, at least in a portion, the second ejecting nozzle group when projected in the main scanning direction.

17. An ink jet recording method comprising:
an ink attachment step including ejecting an aqueous ink composition from a recording head to attach the aqueous ink composition to a recording medium; and
a treatment liquid attachment step including ejecting a treatment liquid containing a flocculant and a nitrogen-containing solvent from a recording head to attach the treatment liquid to the recording medium,
wherein the recording head for ejecting the treatment liquid has a circulation channel configured to circulate the treatment liquid, and
a percentage of the nitrogen-containing solvent to all organic solvents in the treatment liquid is 50.0% by mass or more.

18. The ink jet recording method according to claim 17, wherein
the treatment liquid contains an acyclic amide as the nitrogen-containing solvent.

* * * * *